(12) United States Patent
Morrison et al.

(10) Patent No.: US 11,392,215 B2
(45) Date of Patent: Jul. 19, 2022

(54) BUTTON SUPPLY

(71) Applicant: Zytronic Displays Limited, Blaydon on Tyne (GB)

(72) Inventors: Andrew Morrison, Gateshead (GB); Christopher Graham John Caldwell, Prudhoe (GB)

(73) Assignee: ZYTRONIC DISPLAYS LIMITED, Blaydon on Tyne (GB)

( * ) Notice: Subject to any disclaimer, the term of this patent is extended or adjusted under 35 U.S.C. 154(b) by 0 days.

(21) Appl. No.: 17/283,155

(22) PCT Filed: Oct. 7, 2019

(86) PCT No.: PCT/GB2019/052830
§ 371 (c)(1),
(2) Date: Apr. 6, 2021

(87) PCT Pub. No.: WO2020/074869
PCT Pub. Date: Apr. 16, 2020

(65) Prior Publication Data
US 2021/0349546 A1 Nov. 11, 2021

(30) Foreign Application Priority Data
Oct. 8, 2018 (GB) ...................................... 1816370

(51) Int. Cl.
*G06F 3/02* (2006.01)
*A63F 13/214* (2014.01)
(Continued)

(52) U.S. Cl.
CPC .......... *G06F 3/0202* (2013.01); *A63F 13/214* (2014.09); *G06F 3/0338* (2013.01);
(Continued)

(58) Field of Classification Search
CPC ................ G06F 3/0202; G06F 3/0446; G06F 3/04164; G06F 3/0338; G06F 2203/04103; A63F 13/214; H01H 13/14
(Continued)

(56) References Cited

U.S. PATENT DOCUMENTS 5,572,239 A * 11/1996 Jaeger ................. G05B 19/108
345/172
5,805,145 A * 9/1998 Jaeger ................. G06F 3/0238
345/172
(Continued)

FOREIGN PATENT DOCUMENTS

FR 3033423 A1 9/2016
GB 2502594 A * 12/2013 ........... G06F 3/0445
(Continued)

OTHER PUBLICATIONS

International Search Report and Written Opinion of PCT Application No. PCT/GB2019/052830—19 pages (dated Jan. 23, 2020).

*Primary Examiner* — Mark Edwards
(74) *Attorney, Agent, or Firm* — Knobbe Martens Olson & Bear LLP

(57) ABSTRACT

Apparatus and methods of providing power and/or data to devices at a touch panel are disclosed including a method of manufacturing a touch panel for a touchscreen, comprising the steps of: plotting at least one wire, on a layer of adhesive over a transparent substrate that comprises at least one through hole, in a predetermined pattern that comprises a first portion that extends over the substrate and a further portion that extends over a region of a transparent support that extends over at least a region of the through hole; providing touch electrodes for a touch panel of a touchscreen via the first portion of the plotted wire; and providing a plurality of electrical connectors for a user input device
(Continued)

secured at the through hole, via the further portion of the plotted wire.

20 Claims, 27 Drawing Sheets

(51) Int. Cl.
    *G06F 3/044* (2006.01)
    *G06F 3/041* (2006.01)
    *G06F 3/0338* (2013.01)
    *H01H 13/14* (2006.01)

(52) U.S. Cl.
    CPC ........ G06F 3/0446 (2019.05); G06F 3/04164 (2019.05); *G06F 2203/04103* (2013.01); *H01H 13/14* (2013.01)

(58) Field of Classification Search
    USPC .......................................................... 345/161
    See application file for complete search history.

(56) References Cited

U.S. PATENT DOCUMENTS

2017/0052399 A1    2/2017  Guzman et al.
2017/0293380 A1*  10/2017  Chauveau ........... G06F 3/04164

FOREIGN PATENT DOCUMENTS

| GB | 2502594 A | 12/2013 |
|----|-----------|---------|
| WO | 97/43749 A1 | 11/1997 |
| WO | 2018/109835 A1 | 6/2018 |
| WO | 2018/206947 A2 | 11/2018 |

* cited by examiner

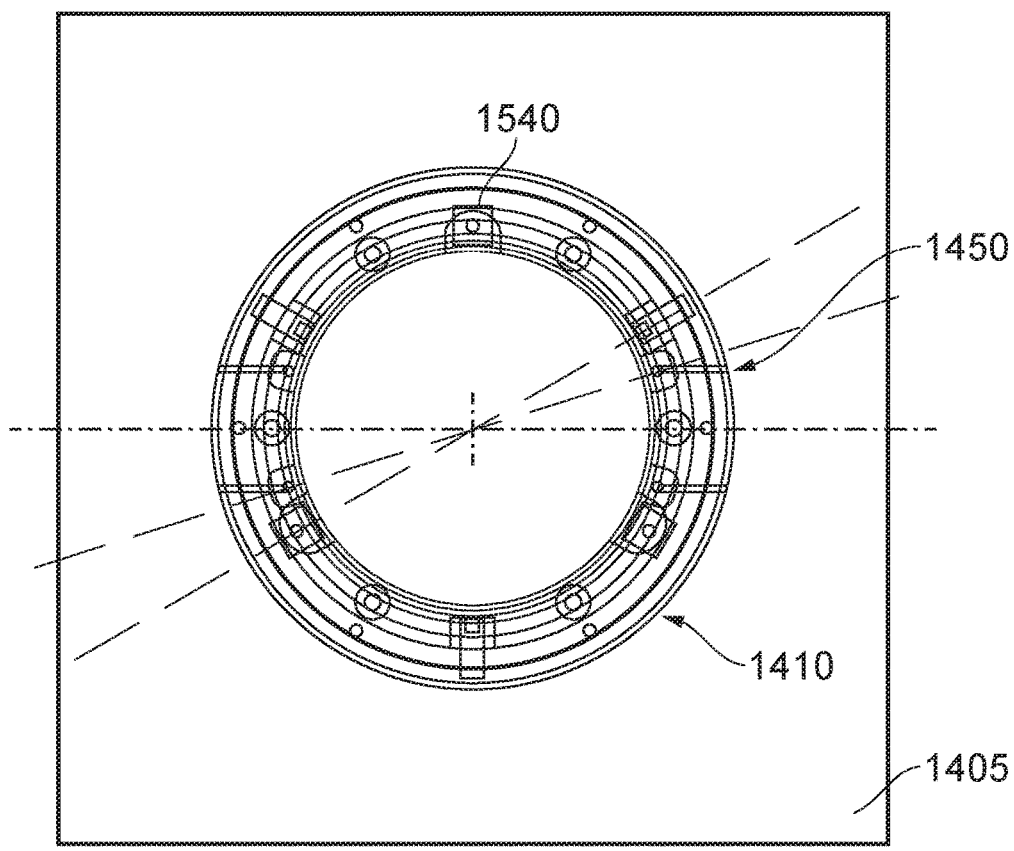
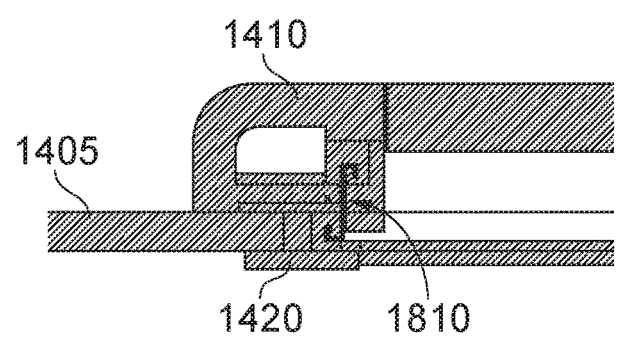
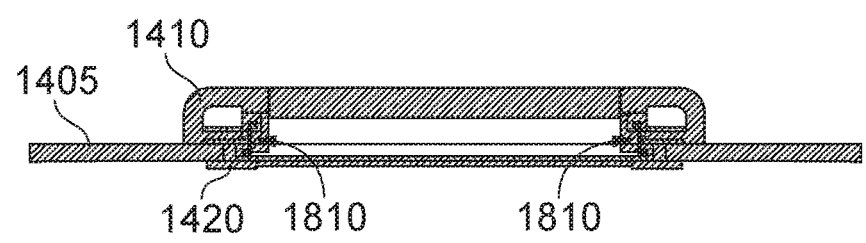
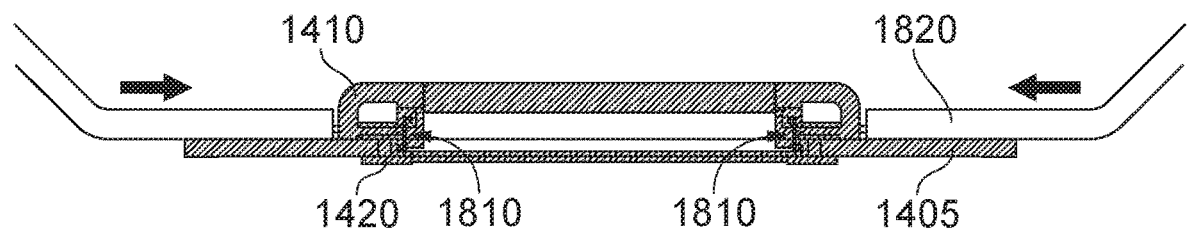
FIG. 18

BUTTON SUPPLY

The present invention relates to a method and apparatus for indicating a user preference at a touch sensitive panel. In particular, but not exclusively, the present invention relates to a touch panel for a touchscreen that includes a touch sensitive area and one or more mechanical user input devices, such as a button or joystick, mounted on the touch panel within a boundary associated with the touch sensitive area whereby each button or joystick is electrically connected, for power and/or data transmission purposes, in a way which is effectively invisible to the human eye.

Many input devices are known which human operators can interact with to thereby provide an input indicating a selection. For example conventional input devices include mechanical input devices like mechanical buttons or keys or joystick or track balls or sliders. Other types of input devices like touchscreens or NFC readers are also known. Touchscreens in particular are increasingly popular and these allow a user to make selections and indicate choice by touching a surface of a touch panel in one or multiple locations with those locations being associated with regions displayed on an underlying display screen. By correlating detected touch positions in the plane of the touch panel with corresponding display positions in the plane of the underlying display a user can select one or more choices. Such selection can be used to indicate an instruction or for many other purposes.

Conventionally touchscreens include a touch panel, a controller and a software driver. A touch panel is a clear panel with a touch sensitive surface. The touch panel is positioned in front of a display so that the touch sensitive surface covers the viewable area of the display screen. The touch panel and associated screen together can be referred to as a touchscreen or display arrangement.

There are many different types of touchscreen technology available including resistive, capacitive, infrared and surface acoustic wave techniques.

A concern expressed by certain users is that touchscreens and selections that are made by utilising touchscreens can be prone to accidently indicating an undesired choice. That is to say some people have expressed a concern that it is relatively easy to accidentally make an undesired choice by using a touchscreen. Whilst in many situations touchscreens operate without such errors there is a desire to be able to allay people's fears on this point. Furthermore there is a desire to be able to incorporate touchscreen technology with other mechanical-type input devices which can be utilised to make certain key decisions or can be used in combination with touchscreen technology when the use of a particular type of mechanical input device is well known in a particular field and therefore human users are well versed in such usage.

An example of one situation where it would be desirable to be able to incorporate a touchscreen display arrangement with mechanical-type buttons is in the gaming industry. Certain gambling machines are well known. These gambling machines or gaming devices operate according to gaming rules and permit human operators to invest their money via a user interface which typically includes artwork and/or display screens and some form of user interface by which the user can indicate bets being placed and choices being made. Conventionally such machines have been mechanical button type machines but more recently a trend towards the use of touchscreens has been observed in the gaming industry. However when certain "large" bets are to be placed there has been a reluctance amongst certain users to use purely touchscreen based gambling devices.

In certain conventional solutions to this problem either a small touchscreen has been used surrounded by conventional mechanical type buttons or a large underlying LCD screen has been overlaid with a small touchscreen. In this latter solution large areas of the underlying LCD screen have been masked off with an opening in the masking being aligned with the touchscreen. Mechanical type buttons have been located offset from the active region of the touchscreen and overlying peripheral portions of the underlying display. These solutions have been unacceptable for a number of reasons. Firstly in the case of a small display and touchscreen with conventional adjacent mechanical buttons the user interface experience is limited and large regions of a playing surface provided to a user remain unused. In the latter case in which buttons are outside a visual area a relatively large display is used which is costly and the user experience is diluted by large areas of unused "real estate".

Furthermore conventionally there have been limits on the techniques and devices available for receiving user input indicating user preference and user selection of various options.

Furthermore in the field of gaming devices in particular there is a constant need to provide new gaming devices able to appeal to new and old users and which provide a convenient and enjoyable environment for a user to spend time and place bets. In particular conventionally many gaming devices have offered limited facilities to a user which limits a period of time for a user to interact with a gaming device.

Any mechanical user input devices such as a button or joystick that are integrated within the active area of the touchscreen require power and/or signalling to be provided to the mechanical device and for signals generated responsive to user activation to somehow be provided from the user input device to a local controller. Conventionally the electrical power supply and data signalling connections for such mechanical devices have been provided by relatively long flexible wired connectors that include metalised traces that are visible to the human eye. This has suffered from the disadvantage that the wiring is visible and unsightly to users of a device. This has been aesthetically displeasing and has proved to be a limit on the provision of transparent displays. The conventional wiring also obscures whatever is displayed on the display panel below the touch panel.

In more detail to get data and power to the button a Flexible Printed Circuit (FPC) tail would, according to a prior art technique, be used to plug in to the underside of the button and the opposite end of the flexi tail would be plugged in to a controller Printed Circuit Board (PCB) that would supply power to the mechanical switch and process data (on/off events) from the switch. Most FPC flexi tails are made from Copper and Polyimide which is non-transparent. Other forms of low visibility FPC tails do exist that are made from transparent PET (polyester film) where the conductive tracks on the FPC are printed using a silver based conductive inks. However, the track widths on such FPC using a printed ink is around the 60 µm to 80 µm feature size which is in fact very visible when placed directly in front of an LCD. Such feature sizes are certainly visible to the human eye and can cause Moiré fringing effects when placed in front of a powered LCD. Another issue with printed conductive tracks on a transparent PET film is that the depth of conductive track feature size is very thin ~1 µm, and this coupled with the fact that most conductive inks have a high resistance compare to traditional copper tracks/wire, makes the printed tracks not desirable in terms of having high resistance which means that the tracks cannot be very long, are not power efficient and difficult to drive with electronics.

It is an aim of the present invention to at least partly mitigate one or more of the above-mentioned problems.

It is an aim of certain embodiments of the present invention to provide one or more user input devices in the form of mechanical buttons or the like mounted in a touch panel of a touchscreen whereby the power and/or data connections in and out of the user input device are far less visible to the human users than is achievable with prior art techniques.

It is an aim of certain embodiments of the present invention to provide a user input device such as a mechanical button which appears to be transparent to a user or which appears effectively transparent to a user in all but a few limited locations.

It is an aim of certain embodiments of the present invention to provide a hybrid display arrangement that incorporates a capacitive touch panel with an underlying display and with one or more user input devices, such as a button, joystick or slider or the like, protruding wholly or at least partially through the touch panel.

It is an aim of certain embodiments of the present invention to provide a display arrangement which includes a display having a screen for displaying a graphical user interface.

It is an aim of certain embodiments of the present invention to provide a computer implemented method which is capable of simultaneously receiving one or more actual touches from a surface of a transparent touch panel and presses or effective presses from a mechanical input device such as a button or joystick or slider or dial or the like located within the active region of the touch panel.

It is an aim of certain embodiments of the present invention to provide a computer system including a processor configured to execute instructions and carry out operations associated with a computer system and which can receive signals from a touch panel and one or more mechanical input devices located within the active area of the touchscreen.

It is an aim of certain embodiments of the present invention to provide a method and apparatus for indicating a user preference at a touch sensitive panel.

It is an aim of certain embodiments of the present invention to enable a user of a device that includes a touch sensitive panel to provide manual input via a hand movement to indicate a user preference which can thereafter be used to make a selection of the indicated preference.

It is an aim of certain embodiments of the present invention to provide a releasably mountable user input device on a touch panel.

It is an aim of certain embodiments of the present invention to provide a hand actuated tool member for releasably mounting a user input device at a touch panel.

It is an aim of certain embodiments of the present invention to provide one or more electronic devices at a touch panel.

It is an aim of certain embodiments of the present invention to provide power and/or data to one or more electronic devices at a touch panel via one or a plurality of wires of the touch panel.

According to a first aspect of the present invention there is provided a method of manufacturing a touch panel for a touchscreen, comprising the steps of:
  plotting at least one wire, on a layer of adhesive over a transparent substrate that comprises at least one through hole, in a predetermined pattern that comprises a first portion that extends over the substrate and a further portion that extends over a region of a transparent support that extends over at least a region of the through hole;
  providing touch electrodes for a touch panel of a touchscreen via the first portion of the plotted wire; and
  providing a plurality of electrical connectors for a user input device secured at the through hole, via the further portion of the plotted wire.

Aptly the method further comprises providing the transparent support by providing a transparent film on an adhesive layer on a first surface of the substrate; whereby
  the transparent film has a respective film hole substantially in registration with each through hole in the substrate and a remainder tail region that extends over the region of the through hole.

Aptly the method further comprises securing a flexible connector strip that comprises a plurality of first conductive pads to the electrical connectors whereby each pad is in respective electrical connection with at least one electrical connector.

Aptly the method further comprises securing a plurality of further conduction pads of the connector strip, each connected to a respective one of the first conduction pads, to respective electrical contacts of the user input device.

Aptly the method further comprises plotting the wire in a pattern whereby wire that provides touch electrodes is interweaved with wire that provides an electrical connector.

Aptly the method further comprises plotting the wire in a pattern whereby at each intersection, wire that provides touch electrodes crosses wire that provides an electrical connector substantially orthogonally.

Aptly the method further comprises providing the transparent substrate by providing a glass substrate comprising at least one pre-cut through hole.

Aptly the method further comprises plotting the wire in a pattern whereby wire of said further portion follows a generally sinusoidal or labyrinthine pathway.

Aptly the method further comprises the step of providing touch electrodes comprises cutting previously plotted wire in a plurality of locations to thereby provide a plurality of X and Y touch electrodes.

Aptly the step of providing electrical connectors comprises cutting previously plotted wire in a plurality of locations to thereby provide a plurality of distinct lengths of wire that extend from an edge region of the substrate to a location over the transparent support within an imaginary boundary associated with an edge of a through hole in the substrate.

Aptly the method further comprises providing a user input device at the through hole by securing a mechanical button or joystick or the like to the substrate at the through hole whereby at least one contact switch of the user input device is electrically connected with at least one electrical connector provided via the further portion of the plotted wire.

According to a second aspect of the present invention there is provided a touch panel for a touchscreen, comprising:
  a plurality of touch electrodes provided by cut sections of at least one wire plotted on a layer of adhesive over a transparent substrate that comprises at least one through hole;
  a plurality of electrical connectors provided via cut sections of at least one wire plotted on said layer; and
  at least one user input device each secured at a respective through hole in the substrate wherein each user input device comprises at least one switch element electrically connected with at least one said electrical connector.

Aptly the touch electrodes comprise a first group of electrodes that extend across a region of the substrate following a constant repetitive pathway and a further group of electrodes that extend across the substrate following the same constant repetitive pathway for a portion of their length but that include, proximate to a through hole, a modified pathway around an edge of a through hole.

Aptly the electrical connectors comprise plotted sections of wire that extend on the adhesive across the substrate and beyond an edge of a through hole on a region of a layer of adhesive over a region of a transparent support.

Aptly each electrical connector comprises at least one end portion of one or more sections of plotted wire that are electrically connected to a pad of a flexible connector strip.

Aptly a touch controller unit connected to end regions of the touch electrodes and end regions of the electrical connectors via respective connecting elements at an edge region of the substrate.

Aptly the touch panel further comprises a user input device at each through hole in the substrate, each user input device comprising a fascia member at a touch surface of the substrate, a base member spaced apart from but secured to the fascia member, a user movement member between the fascia member and the base member when the user movement member is moveable by a touch panel users hand; and
at least one switch element, that has a state selectable by movement of user movement member, that is in electrical communication, via at least one electrical connector, to a controller of the touch panel.

Aptly the touch panel is arranged to sense touches via an active area of the touch panel and further user input via movement of a user input device indicative of a user choice.

According to a third aspect of the present invention there is provided a touchscreen, comprising a display and a touch panel that comprises a plurality of touch electrodes provided by cut sections comprising a plurality of touch electrodes provided by cut sections of at least one wire plotted on a layer of adhesive over a transparent substrate that comprises at least one through hole;
a plurality of electrical connectors provided via cut sections of at least one wire plotted on said layer; and
at least one user input device each secured at a respective through hole in the substrate wherein each user input device comprises at least one switch element electrically connected with at least one said electrical connector.

According to a fourth aspect of the present invention there is provided a gaming machine, arcade game, kiosk, ATM or digital sign comprising the touchscreen of the third aspect of the present invention.

According to a fifth aspect of the present invention there is provided a user input button for a touch panel comprising a transparent substrate including at least one through hole, comprising:
a fascia member;
a base member;
a user movement member between the fascia member and the base member;
at least one switch element that has a state selectable by movement of the user movement member; and
a flexible connector strip comprising a plurality of first contact pads, at a distal end of the flexible connector strip, connected to electrical connectors provided via wire plotted on an adhesive layer, and further contact pads in respective electrical communication with the first contact pads connected to wires that extend through the user input button to connect the switch element to the electrical connectors.

Aptly the user movement member is a button member manufactured from a transparent material.

Aptly the button member is glass or plastic and has a cross section that provides a lensing effect.

According to a sixth aspect of the present invention there is provided apparatus for mounting a user input button on a touch panel comprising at least one through hole, comprising:
an upper collar member locatable proximate to a through hole on an upper surface of a touch panel;
a lower collar member locatable proximate to the through hole on a lower surface of the touch panel;
a user input button comprising at least one recess in a button housing;
at least one securing element configured to secure the user input button to the upper collar member; and
a hand actuated tool member comprising at least one elongate pin element, wherein insertion of each elongate pin element through a respective recess disengages the at least one securing element from the upper collar member for releasably mounting the user input button on the upper collar member.

Aptly a portion of the upper collar member is locatable within the through hole of the touch panel.

Aptly a portion of the lower collar member is locatable within the through hole.

Aptly the lower collar member is secured to the touch panel via a compression fitment between the portion of the lower collar member and an inner surface of the through hole.

Aptly the apparatus further comprises:
a transparent plate member locatable within the lower collar member.

Aptly the touch panel further comprises at least one electrical contact proximate to an edge of the through hole.

Aptly the at least one securing element comprises a biasing element.

Aptly the hand actuated tool member further comprises a handle portion.

Aptly the handle portion is disposed at an angle to the at least one elongate pin element.

According to a seventh aspect of the present invention there is provided a user input button for a touch panel comprising at least one through hole, comprising:
a button housing comprising a fascia member and a base member;
a ring member locatable on the base member, comprising at least one switch element; and
a user movement member configured to selectively engage the at least one switch element responsive to input from a user; wherein
the button housing further comprises at least one recess configured to receive a tool for removing the user input button from the touch panel.

Aptly the user input button further comprises:
at least one securing element.

Aptly the user movement member is transparent or translucent.

Aptly the user input button further comprises:
at least one biasing element disposed between the user movement member and the at least one switch element.

According to an eighth aspect of the present invention there is provided a method of providing a user input button in a touch panel comprising at least one through hole, comprising:

securing an upper collar member proximate to at least one through hole on an upper surface of a touch panel;
  securing a lower collar member proximate to the at least one through hole on a lower surface of the touch panel;
  inserting at least one elongate pin element of a hand actuated tool member into a recess in a button housing of the user input button to engage at least one securing element;
  locating, via the hand actuated tool member, the user input button on the upper collar member; and
  removing the elongate pin element from the recess, thereby securing the user input button to the upper collar member.

Aptly, the step of securing the user input button to the upper collar member further comprises:

locating the at least one securing element into a recess in the upper collar member when the elongate portion of the tool is removed from the user input button.

Aptly, the step of inserting an elongate pin element of a hand actuated tool member into a recess in a button housing, further comprises:

urging the securing element against a biasing force associated with the securing element.

Aptly, the step of securing the user input button to the upper collar member further comprises:

locating the at least one securing element into a recess in the upper collar member when the elongate portion of the tool is removed from the user input button.

Aptly, the step of locating the securing element into a recess in the upper collar member further comprises:

locating a hooked portion of the securing element into the recess in the upper collar member as the securing element is returned to a neutral position via a biasing force associated with the securing element.

According to a ninth aspect of the present invention there is provided apparatus for providing an electronic device at a touch panel, comprising:

at least one wire plotted on a surface of a touch panel to provide a first electrical connector;
  a first electrical contact pad at a first region of the touch panel, connected to a first end region of the first electrical connector; and
  at least one electronic device electrically connected to the first electrical contact pad for receiving power and/or data from the contact pad.

Aptly the apparatus further comprises:

a further electrical contact pad connected to the at least one electronic device; and
  at least one further electrical connector connected to the further electrical contact pad.

Aptly the first electrical contact pad is connected to a plurality of electrical connectors.

Aptly the further electrical contact pad is connected to a plurality of electrical connectors.

Aptly the first electrical connector provides the first electrical contact pad with connection to positive voltage and the further electrical connector provides the further electrical contact pad with connection to ground.

Aptly the apparatus further comprises:

a still further electrical connector for providing power and/or data to the electronic device; and
  a still further electrical contact pad connected to a first end region of the still further electrical connector.

Aptly the electronic device comprises at least one light emitting diode, user input device, speaker unit, haptic device, NFC reader, or a combination thereof.

Aptly each electrical connector is an electrode of the touch panel.

According to a tenth aspect of the present invention there is provided a method of providing an electronic device at a touch panel, comprising:

plotting at least one wire at a surface of a touch panel to provide at least one first electrical connector;
  plotting at least one wire at a surface of the touch panel to provide at least one further electrical connector;
  providing a first electrical contact pad at a first region of the touch panel, thereby connecting the first electrical contact pad to a first end region of the first electrical connector;
  providing a further electrical contact pad at a further region of the touch panel, thereby connecting the further electrical contact pad to a first end region of the further electrical connector;
  connecting an electronic device to the first and further electrical contact pads; and
  connecting an external device to a distal end region of the first and further electrical connectors for providing power and/or data to the electronic device.

Aptly a portion of the at least one wire provides touch electrodes for the touch panel.

Aptly the method further comprises:

plotting the at least one wire in a pattern whereby at each intersection, the portion of the at least one wire that provides touch electrodes crosses wire that provides an electrical connector substantially orthogonally.

Aptly the method further comprises:

plotting the at least one wire in a pattern whereby the portion of wire providing touch electrodes follows a sinusoidal or labyrinthine pattern.

Aptly the electronic device comprises at least one light emitting diode, user input device, speaker unit, haptic device, or NFC reader, or a combination thereof.

Aptly the external device comprises a power supply, an electronic controller, a touch panel controller, or a combination thereof.

Aptly the first and further contact pads comprise at least one tin plated copper track with one end folded back.

Aptly the step of connecting an electronic device to the first and further electrical contact pads comprises:

soldering the electronic device to the first and further electrical contact pads.

Aptly the touch panel comprises a transparent substrate.

According to an eleventh aspect of the present invention there is provided a gaming machine, arcade game, kiosk, ATM or digital sign, comprising at least one user input button, or at least one electronic device, or a combination thereof.

Aptly the gaming machine, arcade game, kiosk, ATM or digital sign further comprises:

the touch panel.

Certain embodiments of the present invention provide a hybrid display arrangement that incorporates at least one capacitive touch panel having an active area and one or more user input devices such as a button or buttons or dial or joystick or slider within the active area or at least partially within the active area of the touch panel.

Certain embodiments of the present invention provide a touch panel and a touchscreen including a touch panel in which the touch panel includes a active area able to sense user touches via a capacitive coupling methodology as well as including one or more user input devices, in the form of buttons or joysticks or the like, within the active area and thus within the footprint of an underlying display. The user input device is provided with power and/or data in/out electrical connections via a connector which is far less visible to a user than prior art techniques allow. For certain embodiments the connecting mechanism is invisible to the human eye.

Certain embodiments of the present invention utilise plotted wire or wires of a type used to provide a touch sensitive area of a touch panel to additionally provide a power and/or a data communication connection to a user input device mounted within a touch panel. Use of fine wire for both the purposes of forming a touch sensitive panel and for providing power and/or data communication to a user input device provides a convenient manufacturing technique as well as meaning that the power and/or data communication connections to the user input device are effectively invisible to the user's eye.

Certain embodiments of the present invention provide a touch panel for a touchscreen which includes a transparent capacitive sensing medium able to detect multiple touches simultaneously together with at least one mechanical user input device such as a button or dial or joystick or slider within an active area of the touch panel which can likewise be utilised to provide user input signals.

Certain embodiments of the present invention enable mechanical buttons to be mounted/embedded within the touch active area of a projected capacitive touch sensor. Data and/or power is carried to and from the mechanical buttons in a manner which is effectively invisible to the human eye.

Certain embodiments of the present invention utilise plotted thin wires on a substrate of a touchscreen as part of a connection pathway to provide power and/or data connectivity to one or more buttons embedded in the touchscreen.

Certain embodiments of the present invention provide a computer implemented method for simultaneously receiving one or more actual touches on a touchscreen and simultaneous, or close in time, presses, rotations or sliding actions on a mechanical input device located within an active region of a touchscreen or touch panel.

Certain embodiments of the present invention provide an arcade game or a gambling machine in which a user can use a touchscreen and/or button/s and/or dials within an active region of the touchscreen to play or place bets.

Certain embodiments of the present invention provide a computer system of an information kiosk, automated teller machine (ATM), point of sale machine (POS), industrial machine, gaming machine, arcade machine, vending machine, airline e-ticket terminal, restaurant reservation terminal, customer service station or the like. The arcade machine can be a table top game or uptight cabinet game or sit-down cabinet game.

Certain embodiments of the present invention provide a method and apparatus for indicating a user preference at a touch sensitive panel. The indicated user preference can be selected, to initiate a predetermined action, automatically subsequent to identification or selection may be confirmed via a further user input possibly, for example, by pressing a mechanical button and/or a virtual button displayed on a display of a touchscreen or located in a region of a touch panel.

Certain embodiments of the present invention provide a gaming device or arcade game which provides a convenient and enjoyable environment for a user.

Certain embodiments of the present invention use a set of 10 µm insulated copper electrodes that are embedded within a main touch sensor x-y array (which also use 10 µm copper electrodes) of a touch panel. These are provided as dedicated electrodes that are used to carry data and/or power to and from the mechanical buttons or other such user input device/s embedded within the main touch active area of the sensor. Optionally, data and/or power electrodes may also be provided for use with electronic devices provided at the touch panel, such as LEDs. A benefit of using the 10 µm insulated copper wire is that its resistance is very low ~200 Ohm/m with good conductivity, and the feature size is small ~10 µm to reduce visibility of the data and power connections to and from the mechanical buttons. Since the 10 µm copper wire is also insulated, the electrodes can be plotted as part of the main touchscreen x-y matrix plotting process without shorting these electrodes to the surrounding x-y touchscreen electrodes. The mechanical button power and data electrodes are interwoven within the main x-y touch sensor electrodes in a way to minimise any optical visibility or Moiré fringing effects.

Certain embodiments of the present invention allow a user input device at a touch panel to be replaced. For example, should a user input device at a touch panel become damaged or malfunction then certain embodiments of the present invention provide a way for the user input device to be replaced without replacing the touch panel.

Certain embodiments of the present invention provide visual cues to users of a touch panel using electronic devices at the touch panel. For example, light emitting diodes at the touch panel may be used to indicate information to a user, such as indicating a user preference or indicating a request for user input or for indicating WiFi availability.

Certain embodiments of the present invention allow electronic devices to be provided at a touch panel in such a way that the electronic devices appear to be floating on the touch panel. Providing power via electrodes in the touch panel may provide the appearance that an electronic device has no visible external connectors.

Certain embodiments of the present invention will now be described hereinafter, by way of example only, with reference to the accompanying drawings in which.

Figure 5:
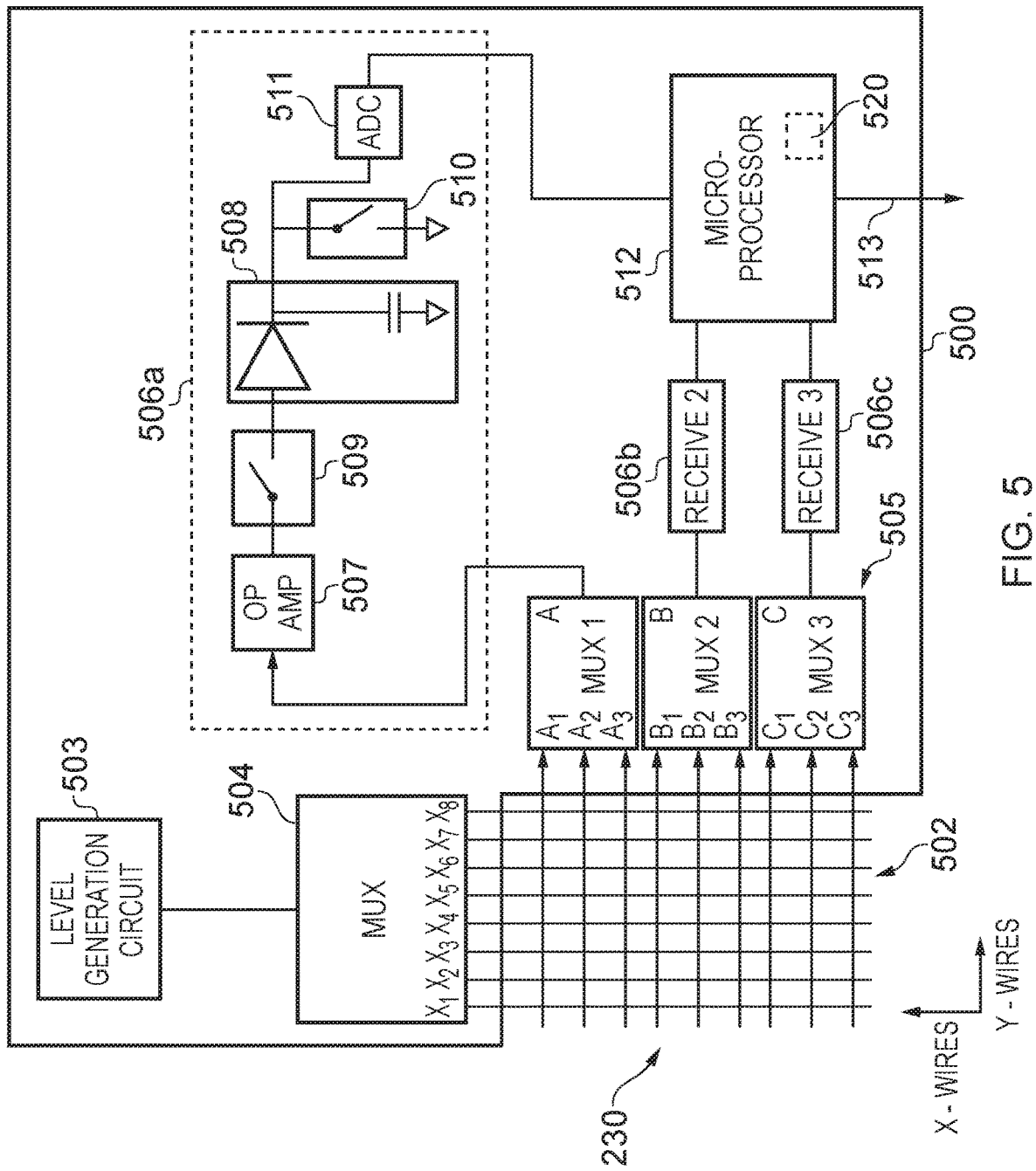
Figure 6:
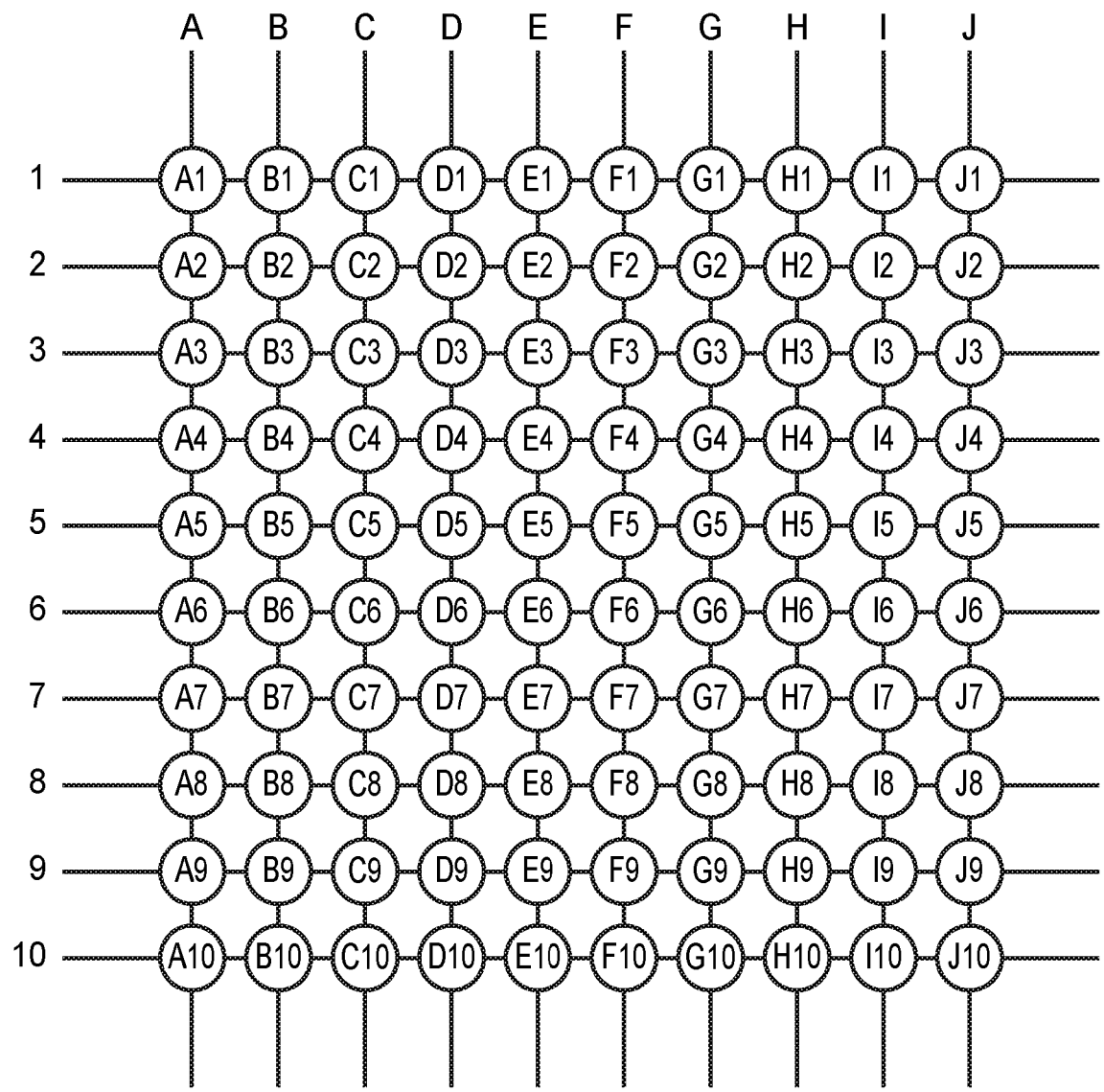
Figure 7:
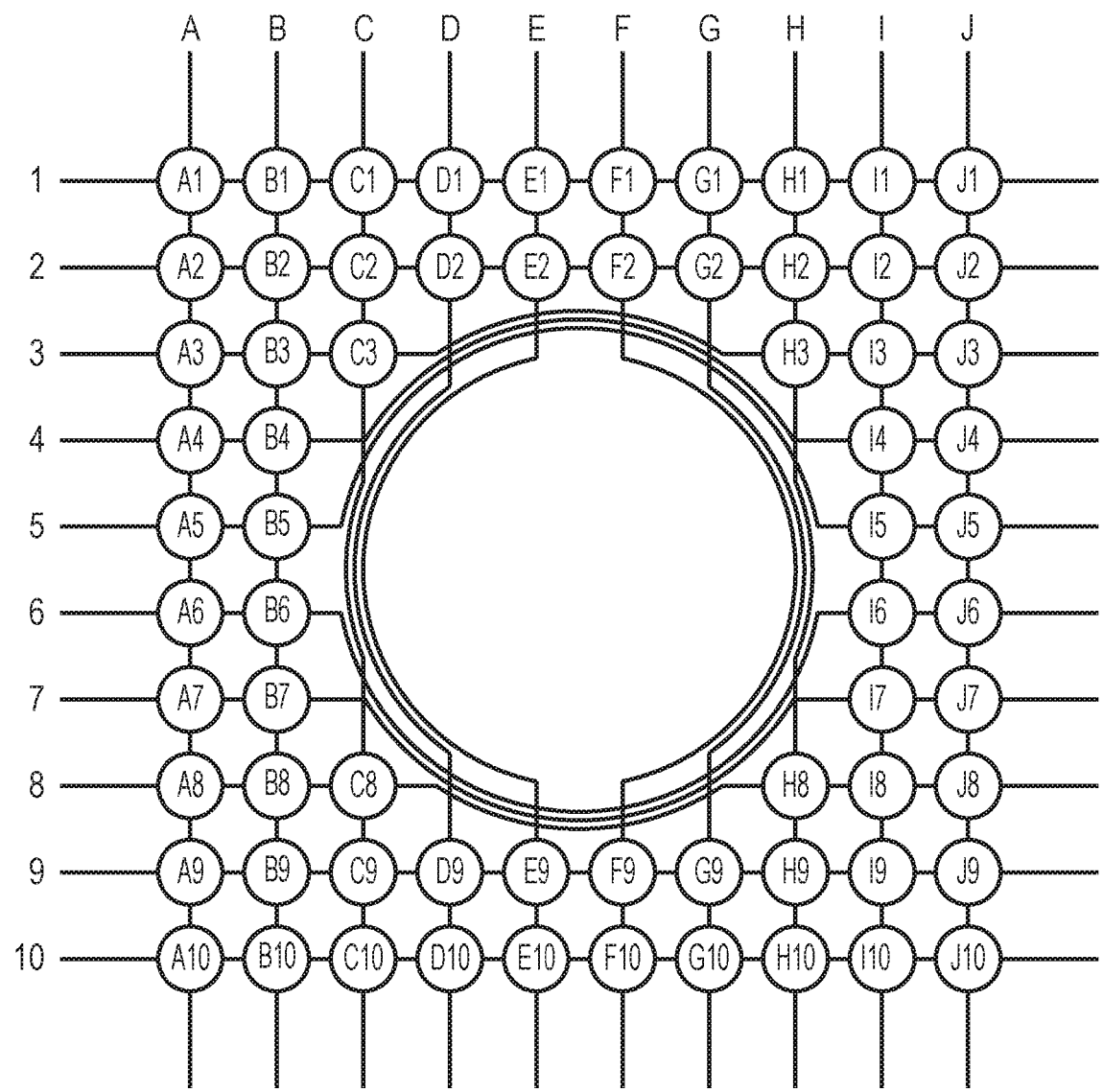
Figure 8:
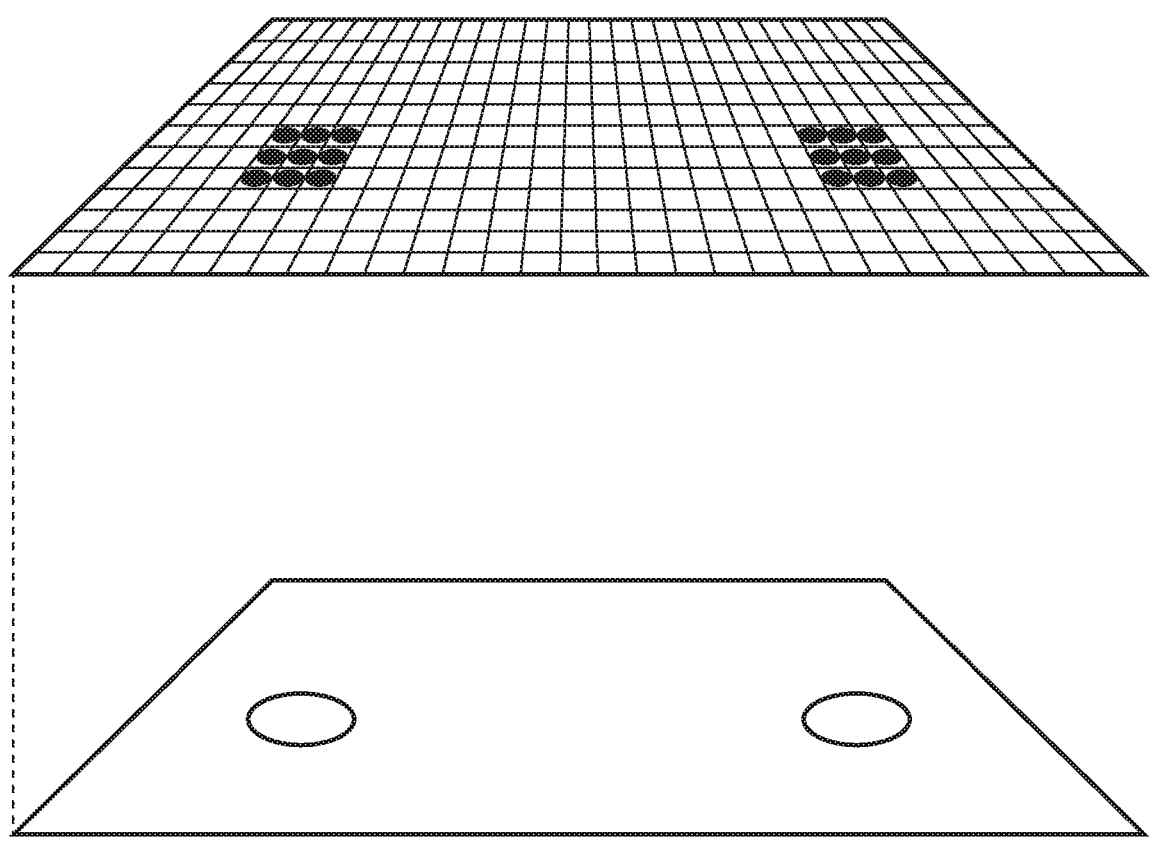
Figure 9:
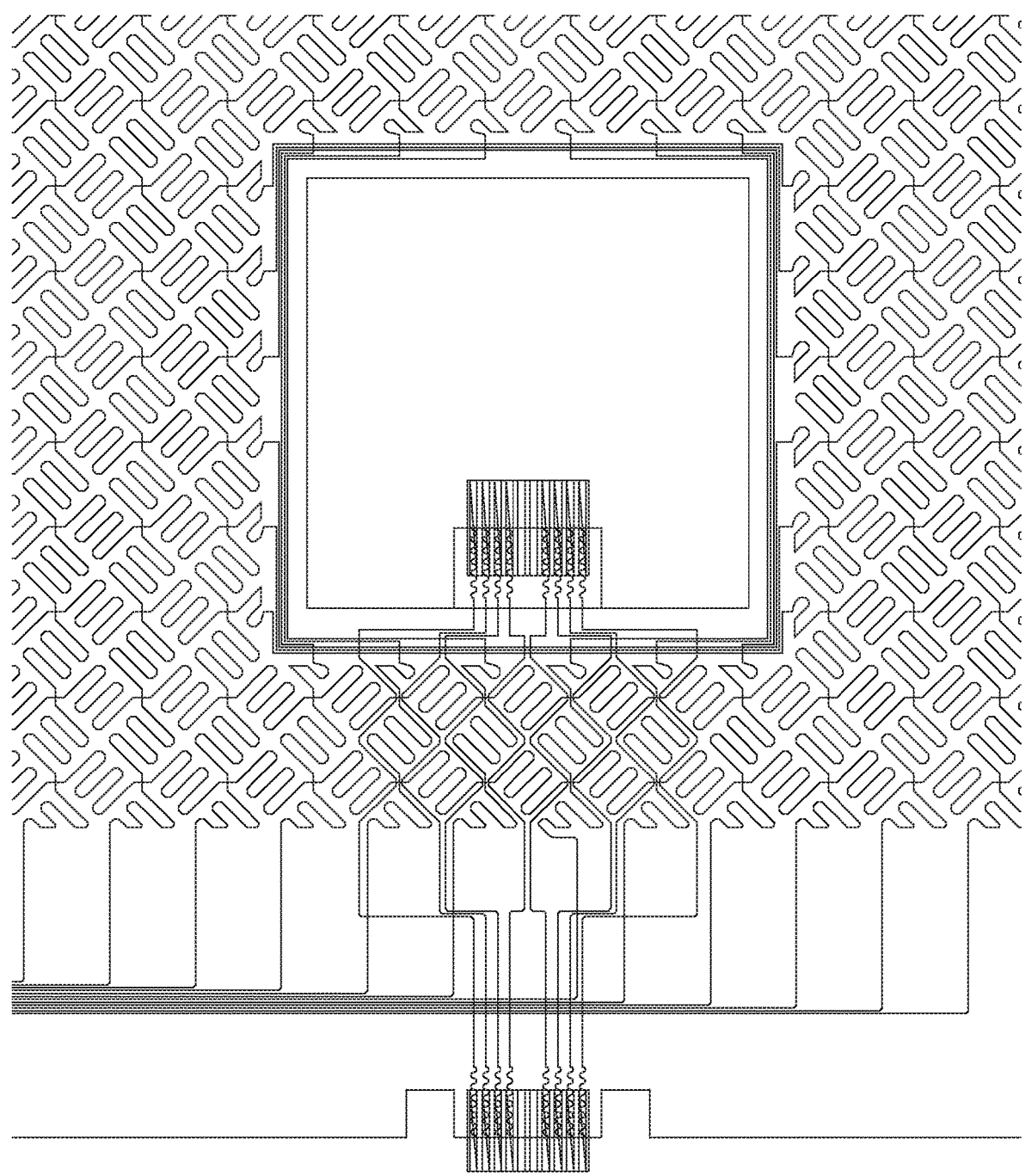
Figure 10:
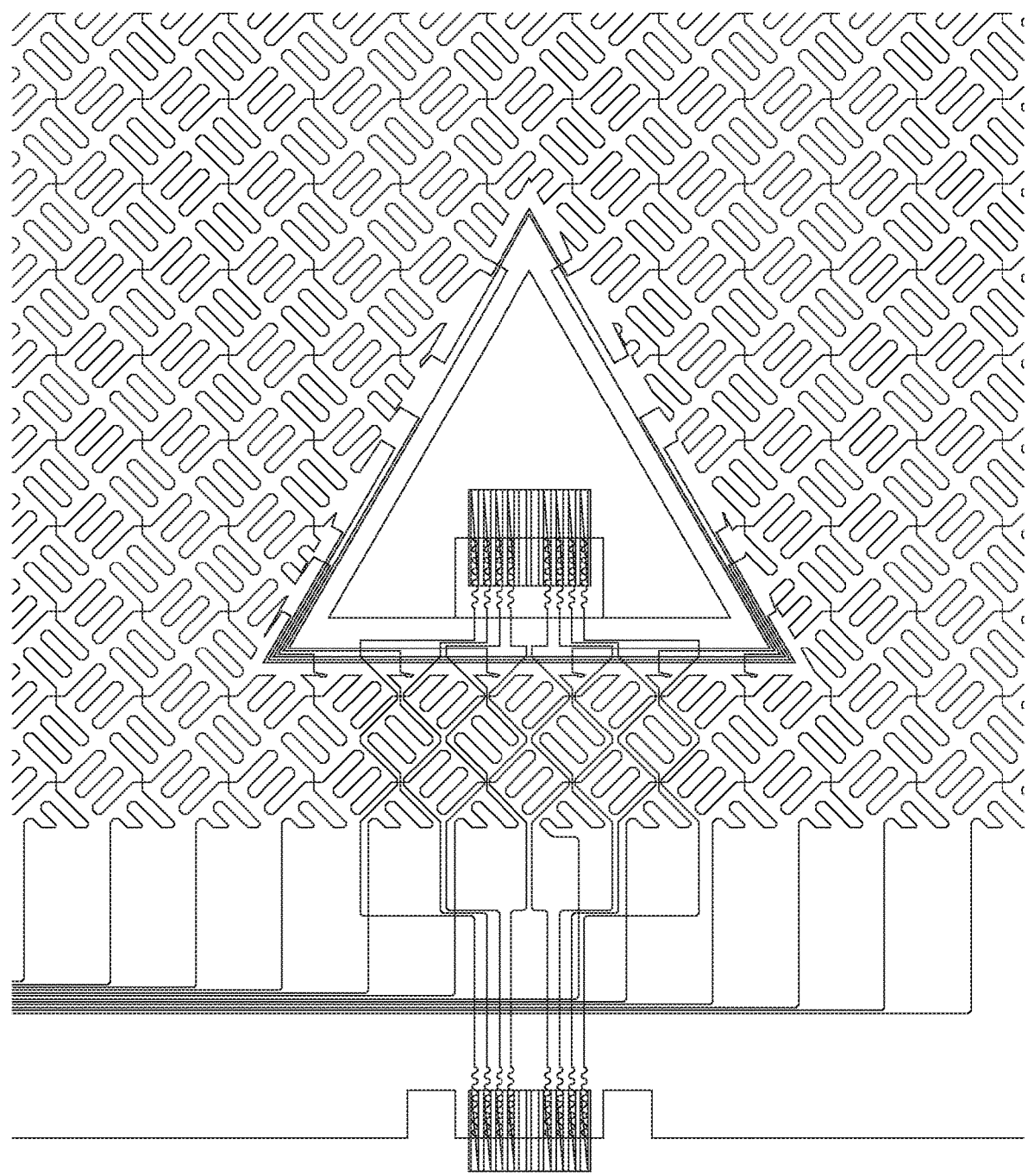
Figure 11:
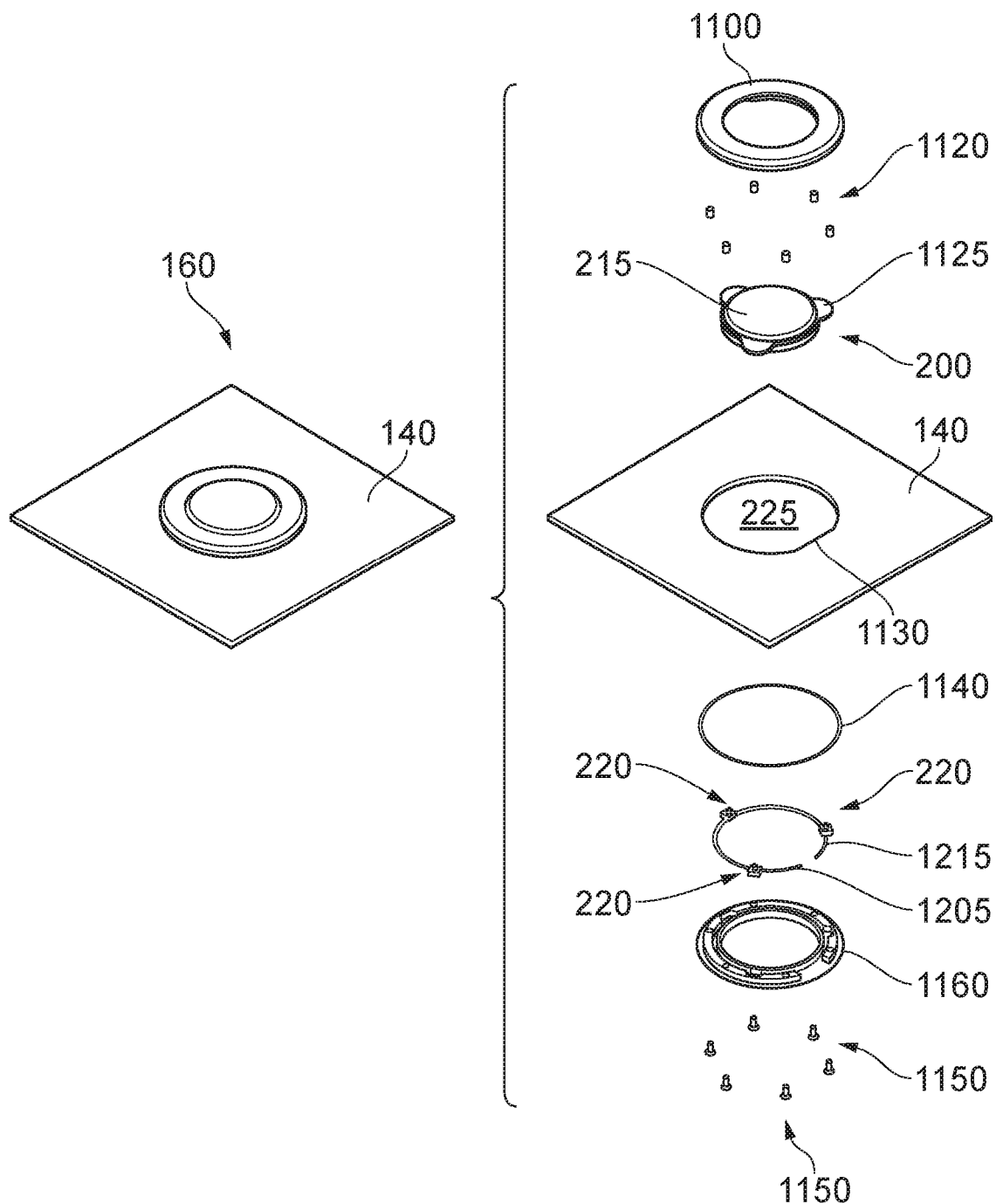
Figure 12:
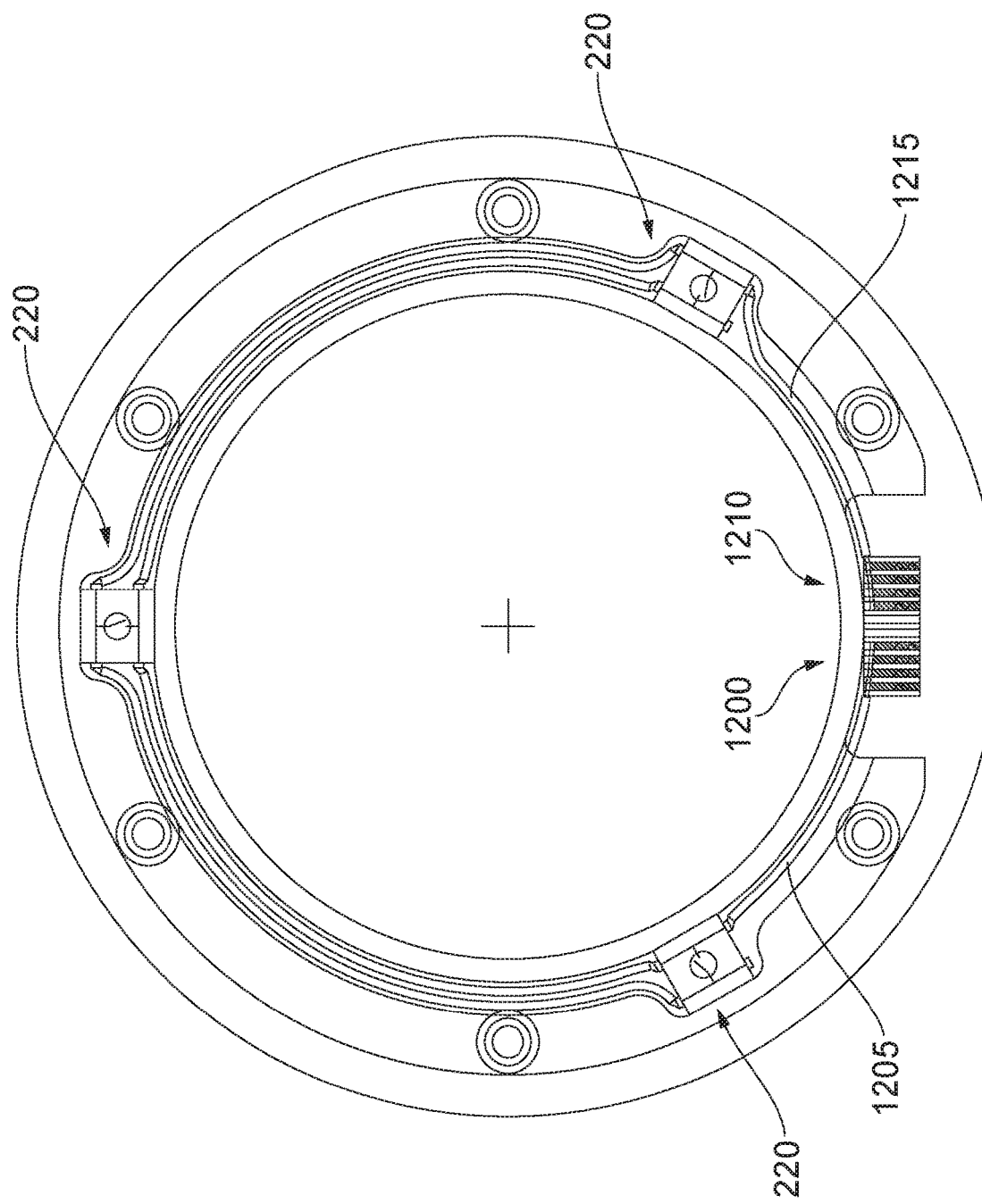
Figure 13:
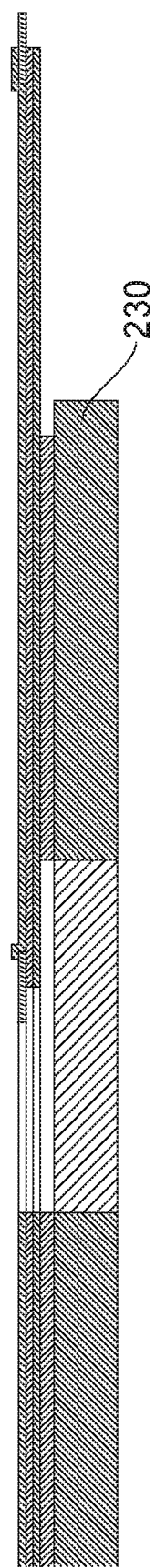
Figure 14:
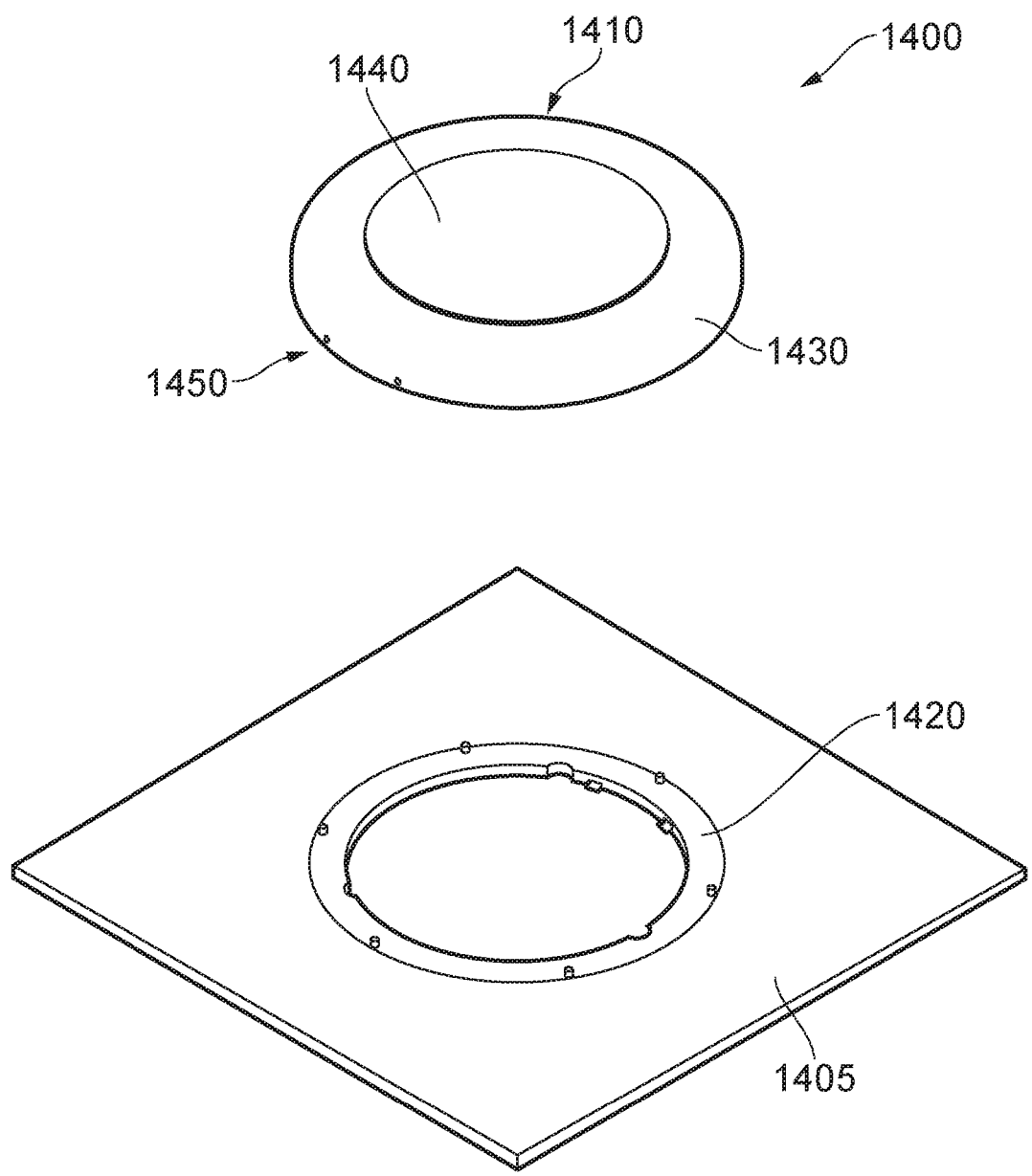
Figure 15:
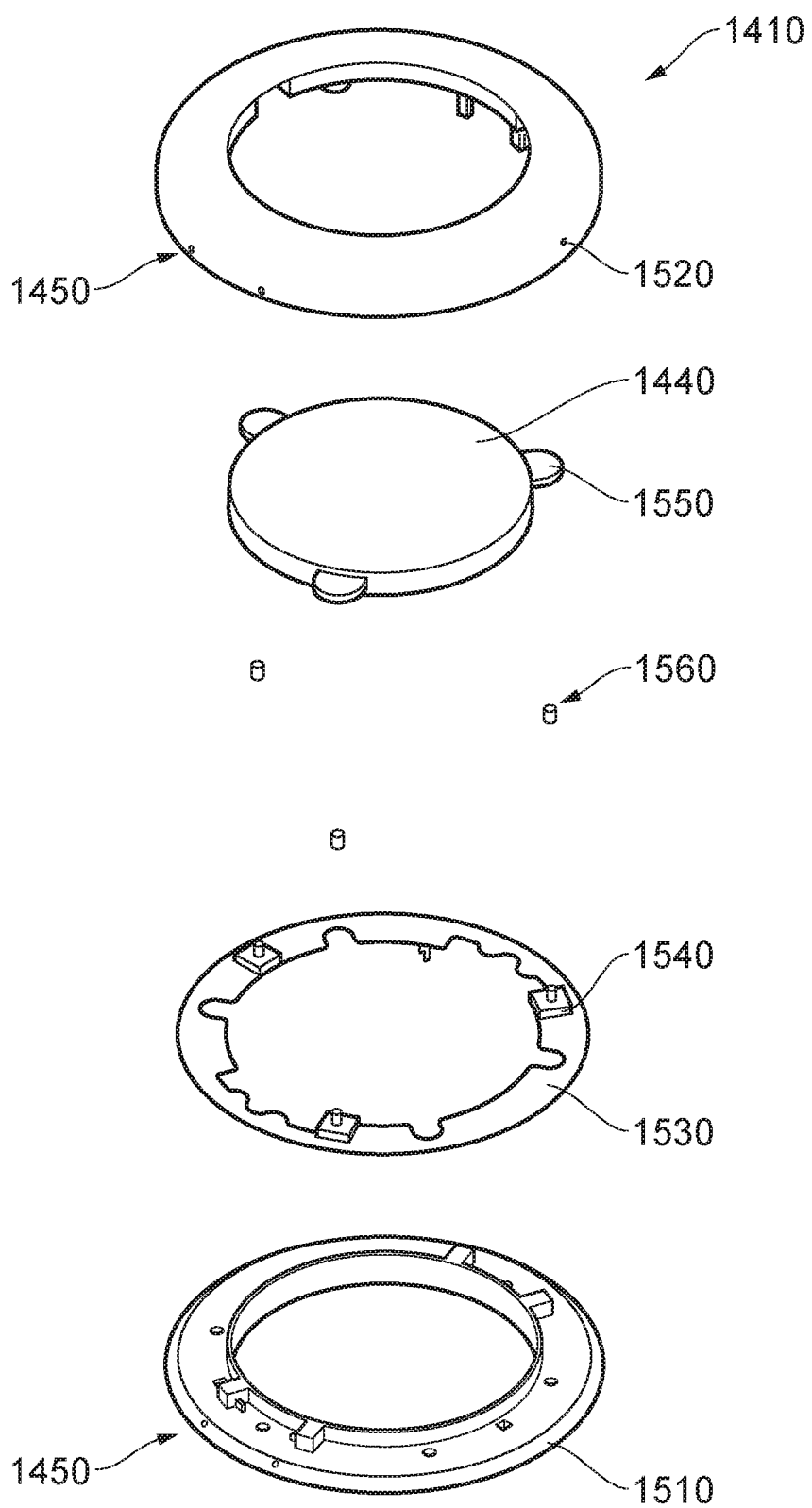
Figure 16:
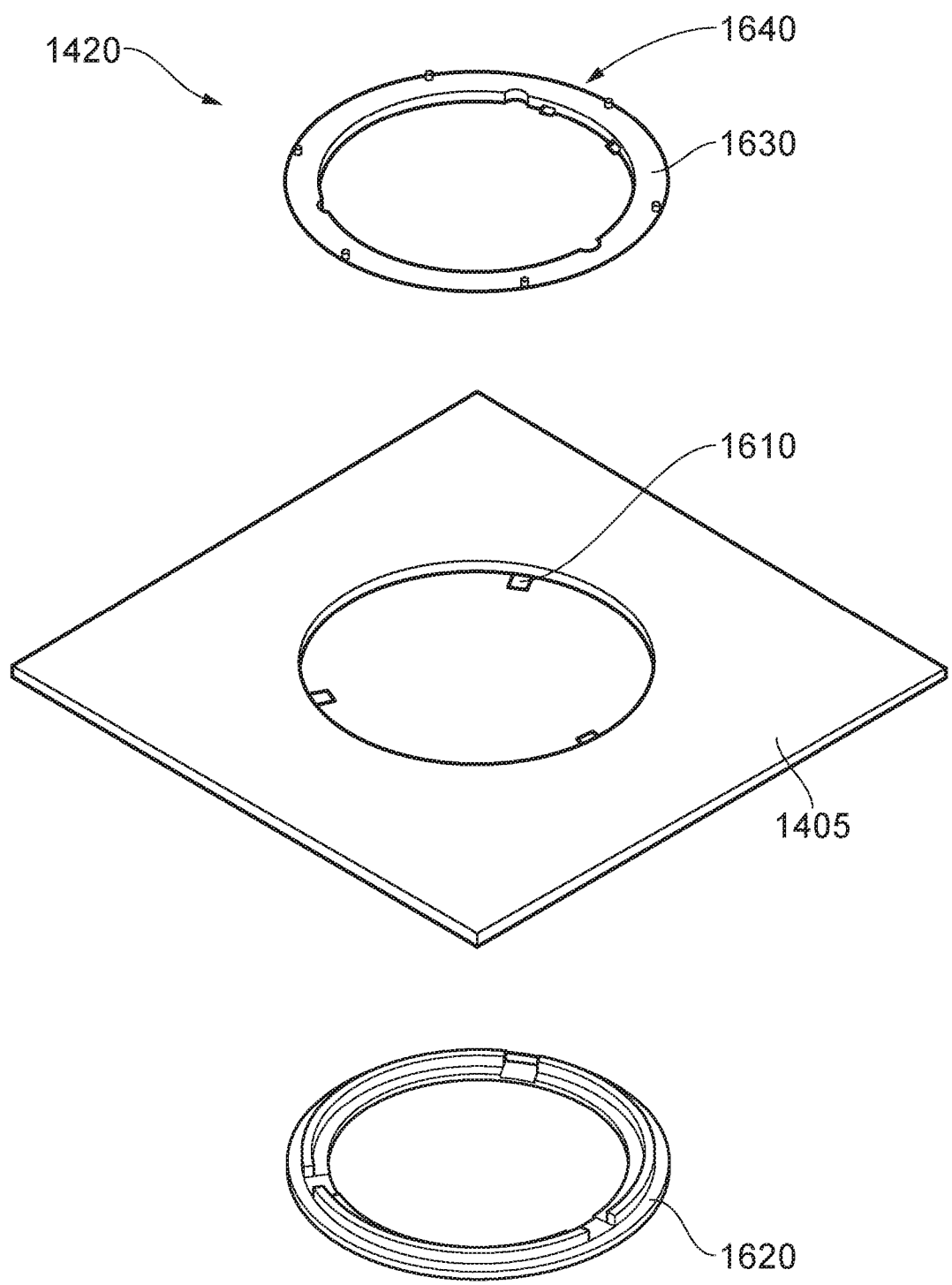
Figure 17:
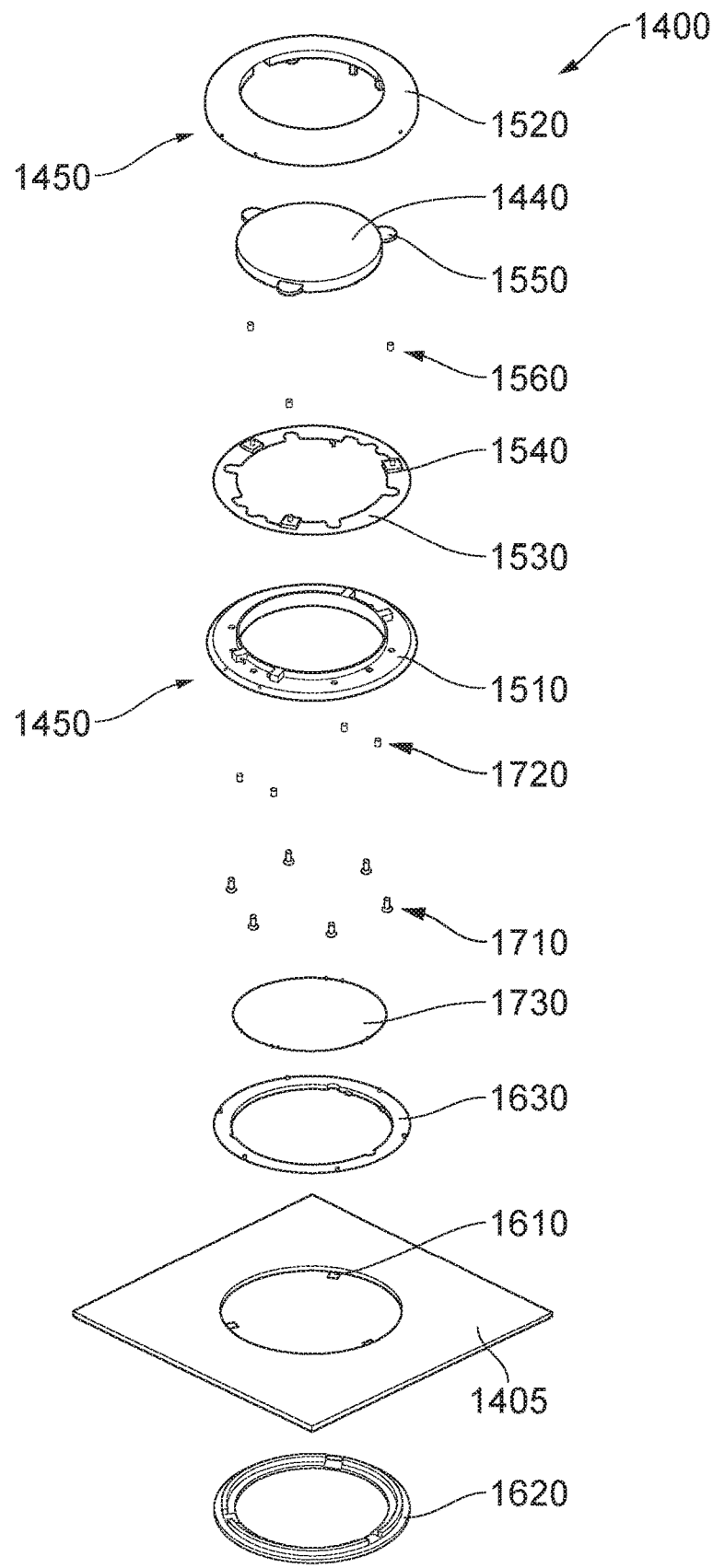
Figure 19:
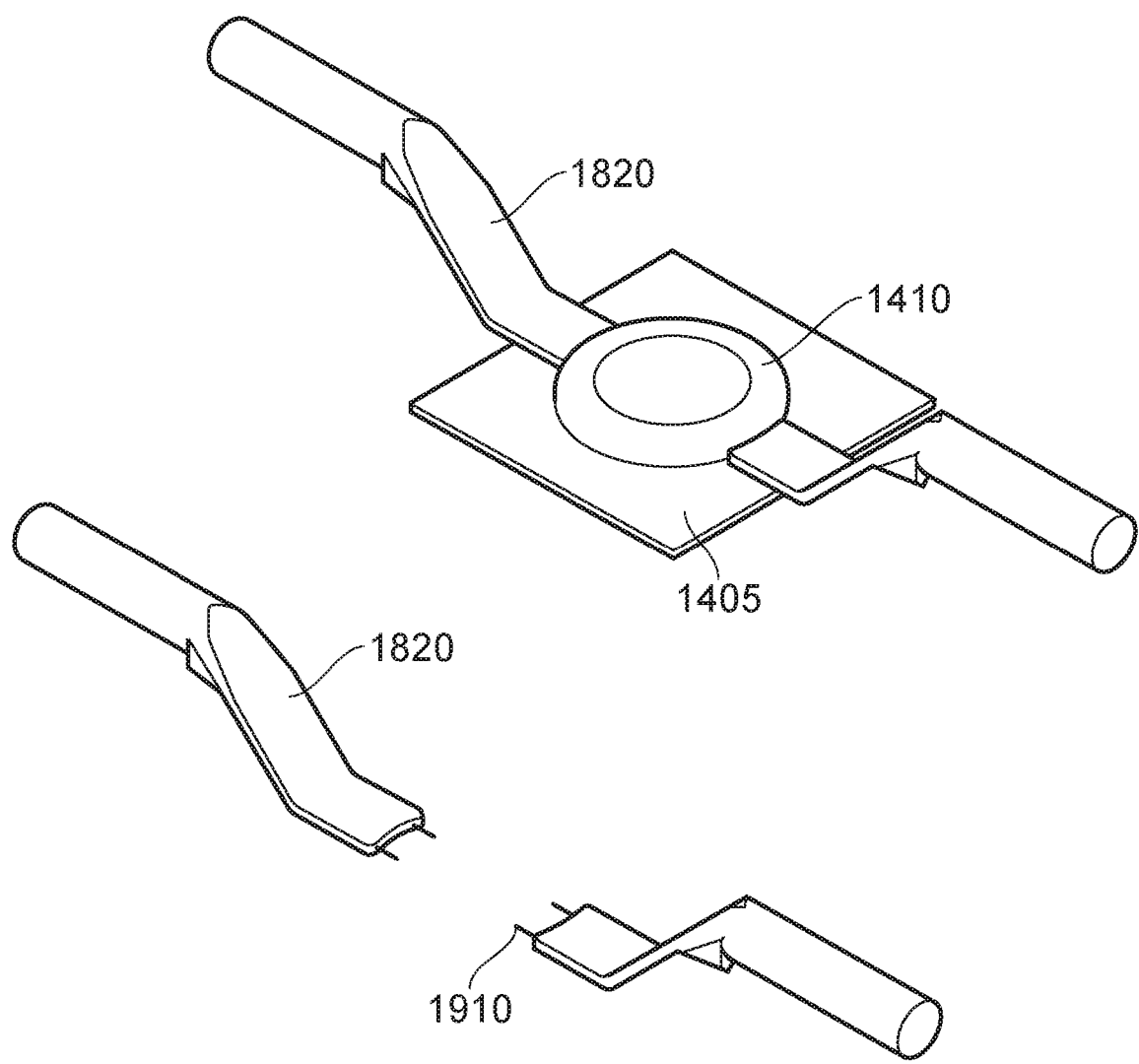
Figure 20:
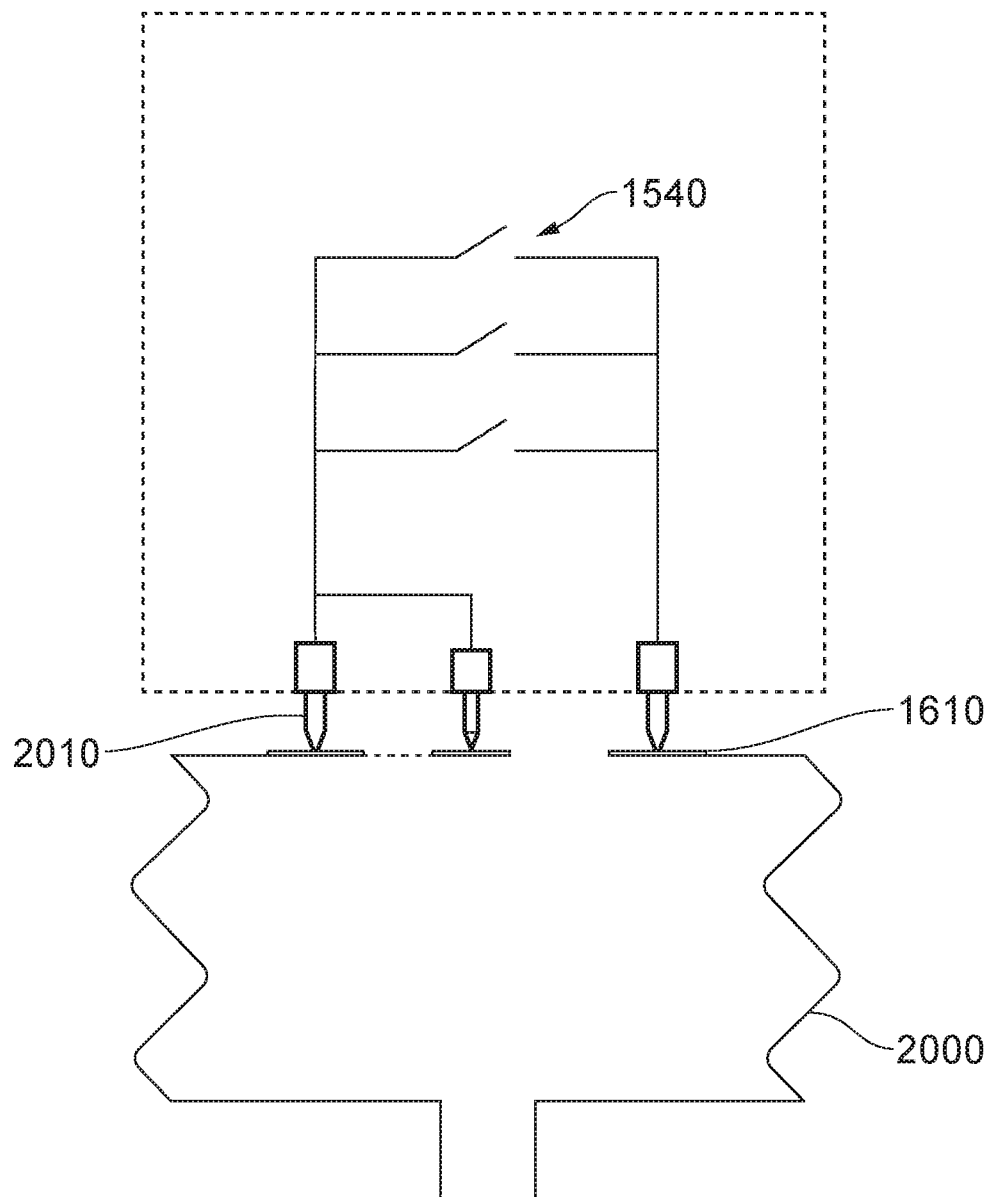
Figure 21:
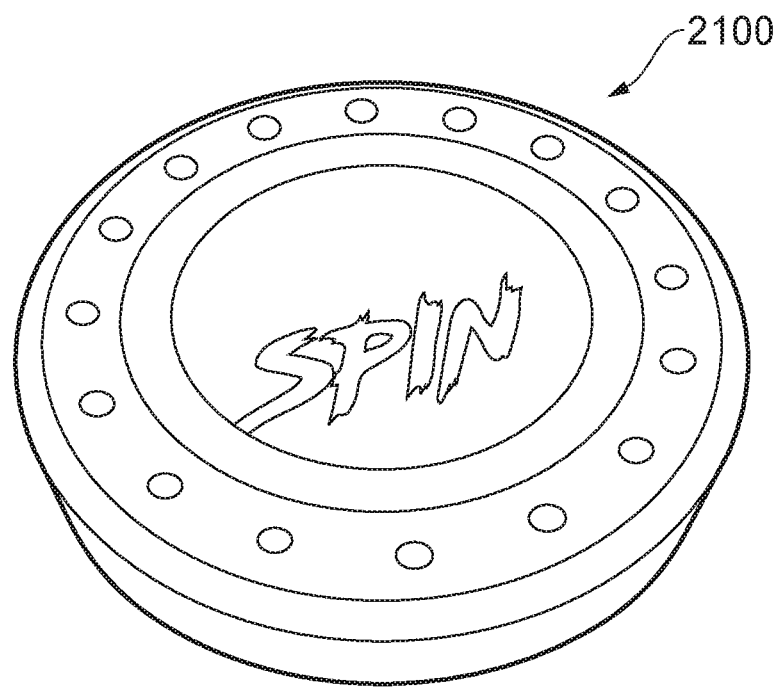
Figure 22:
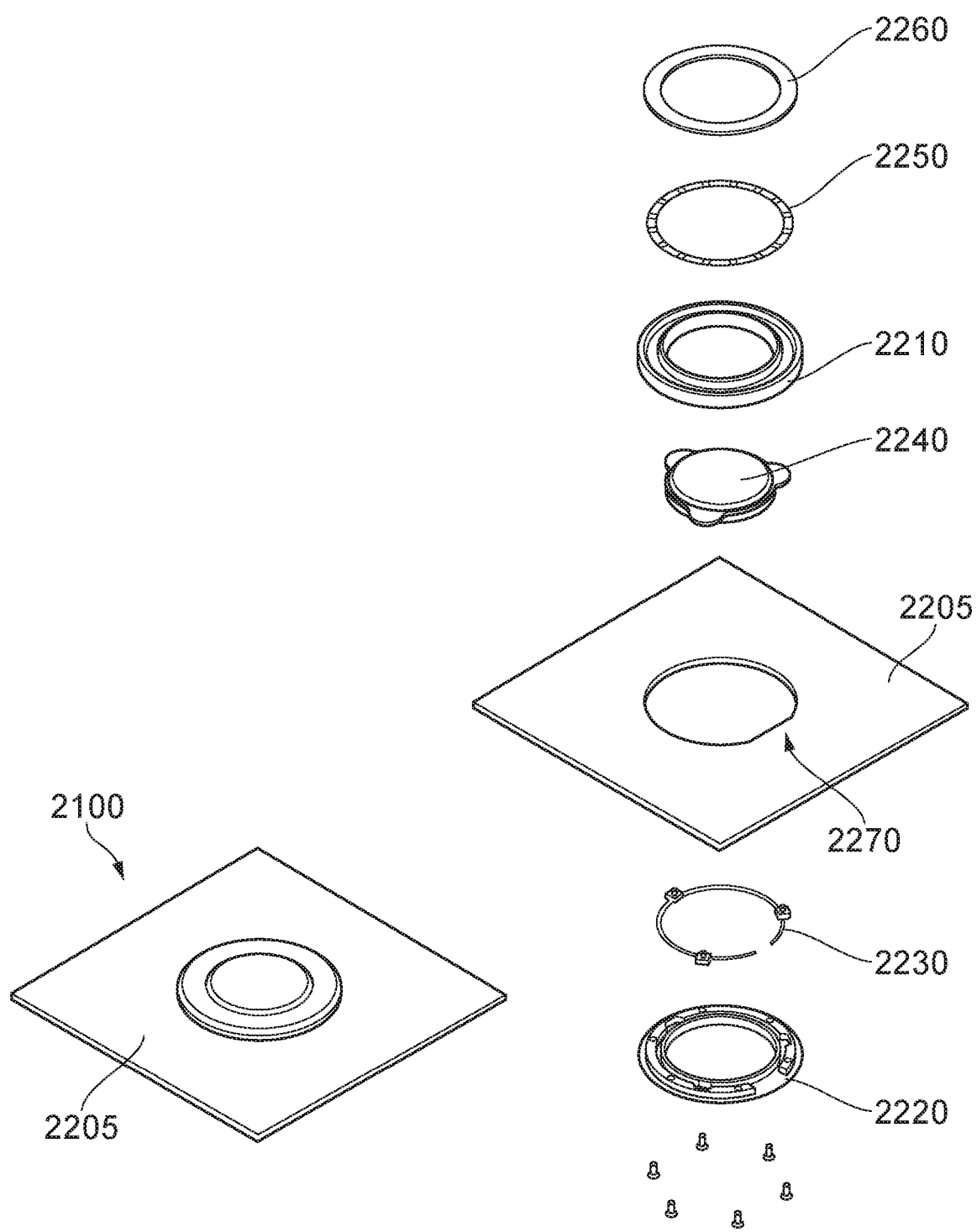
Figure 23:
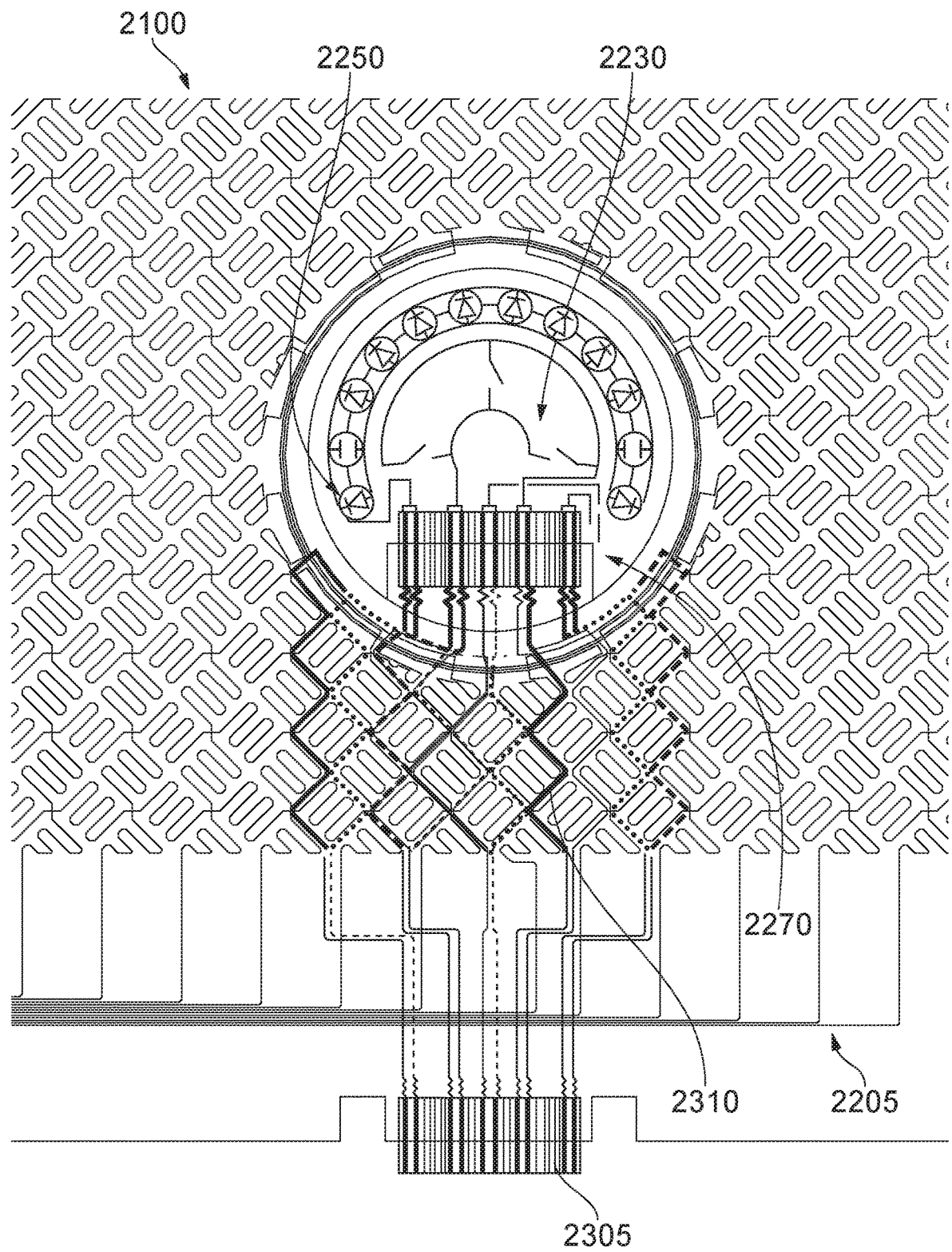
Figure 24:
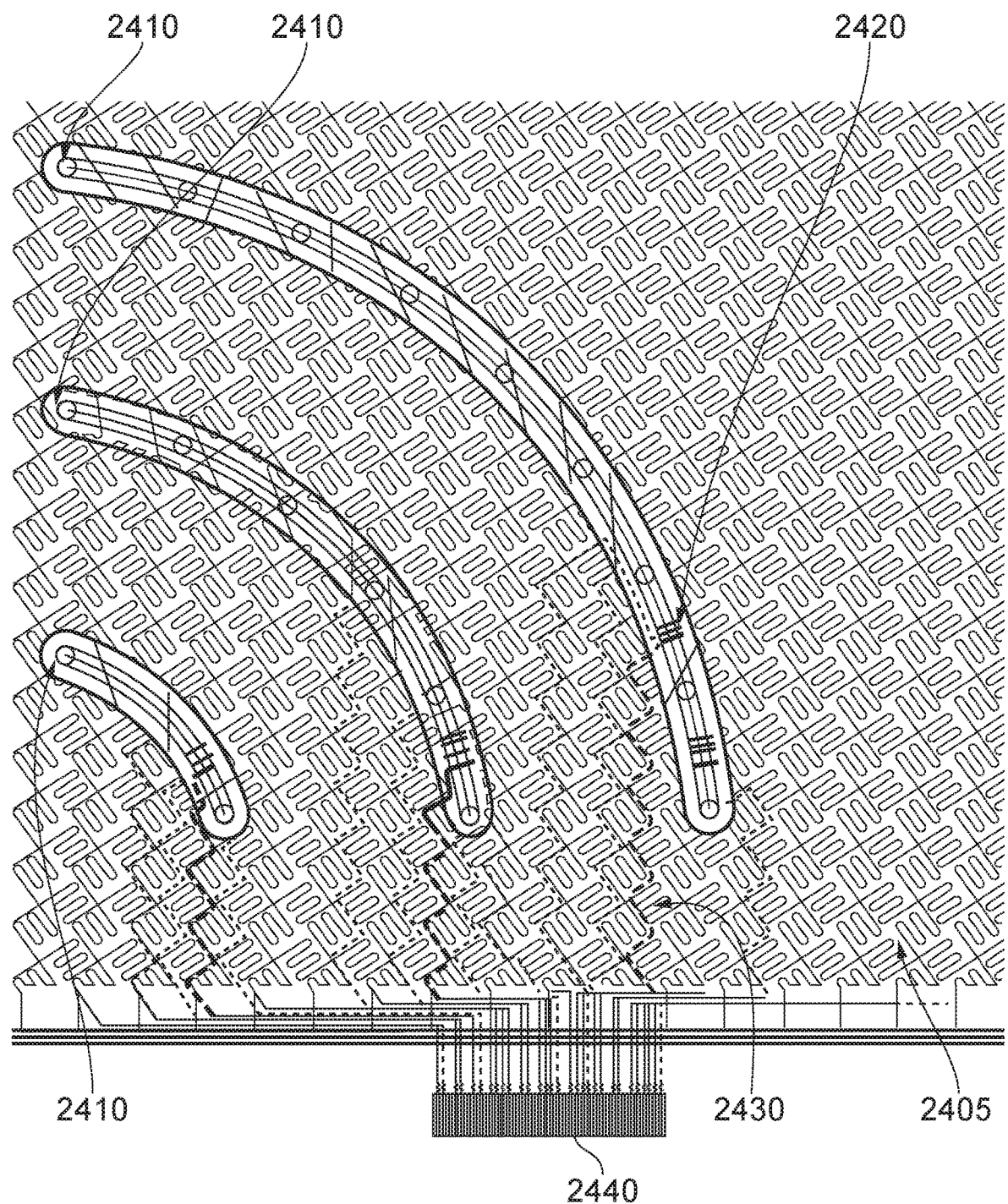
Figure 25:
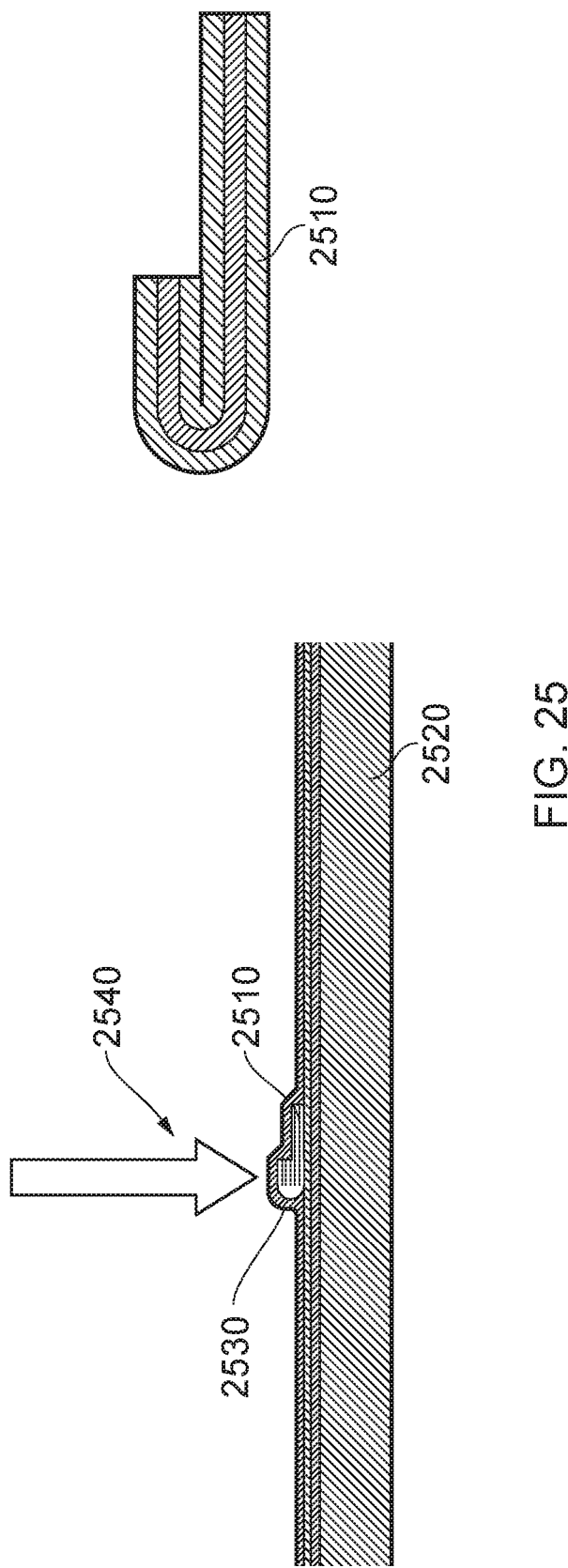
Figure 26:
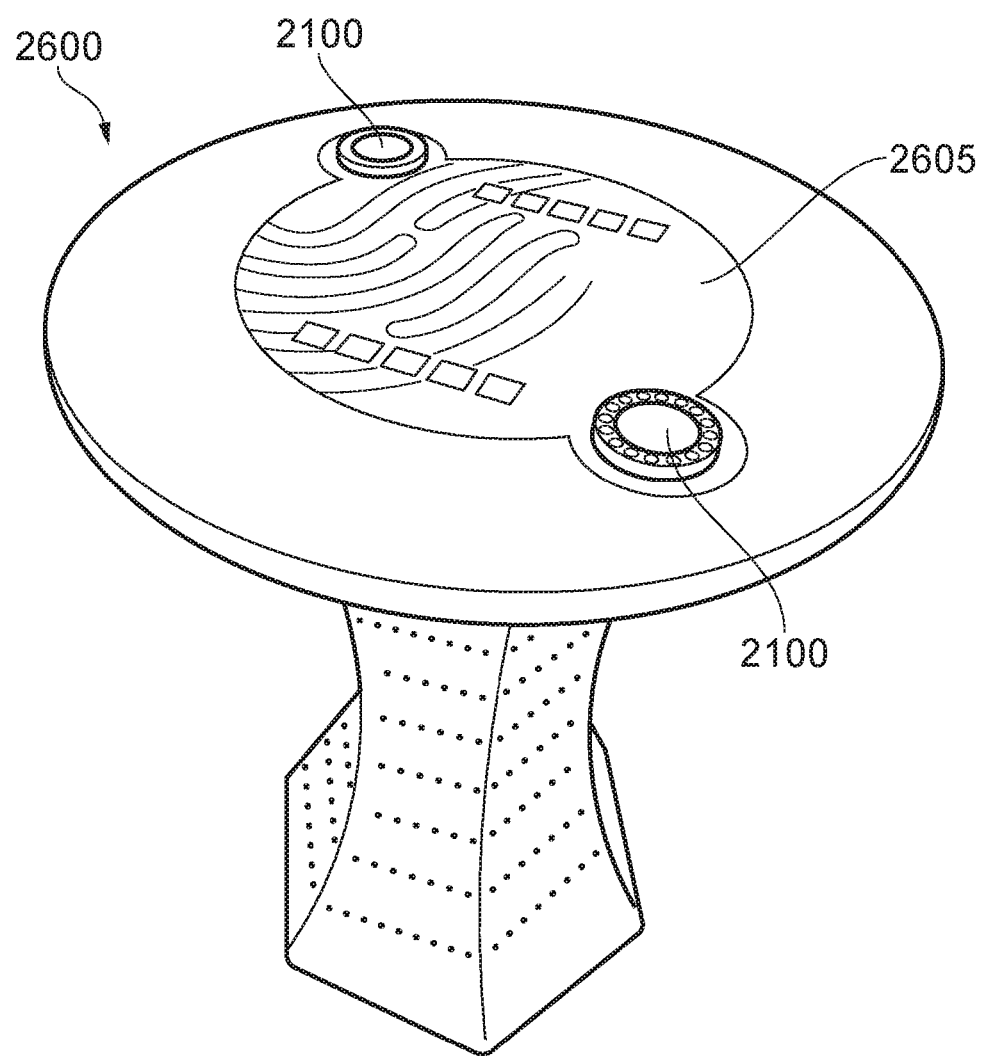
Figure 27:
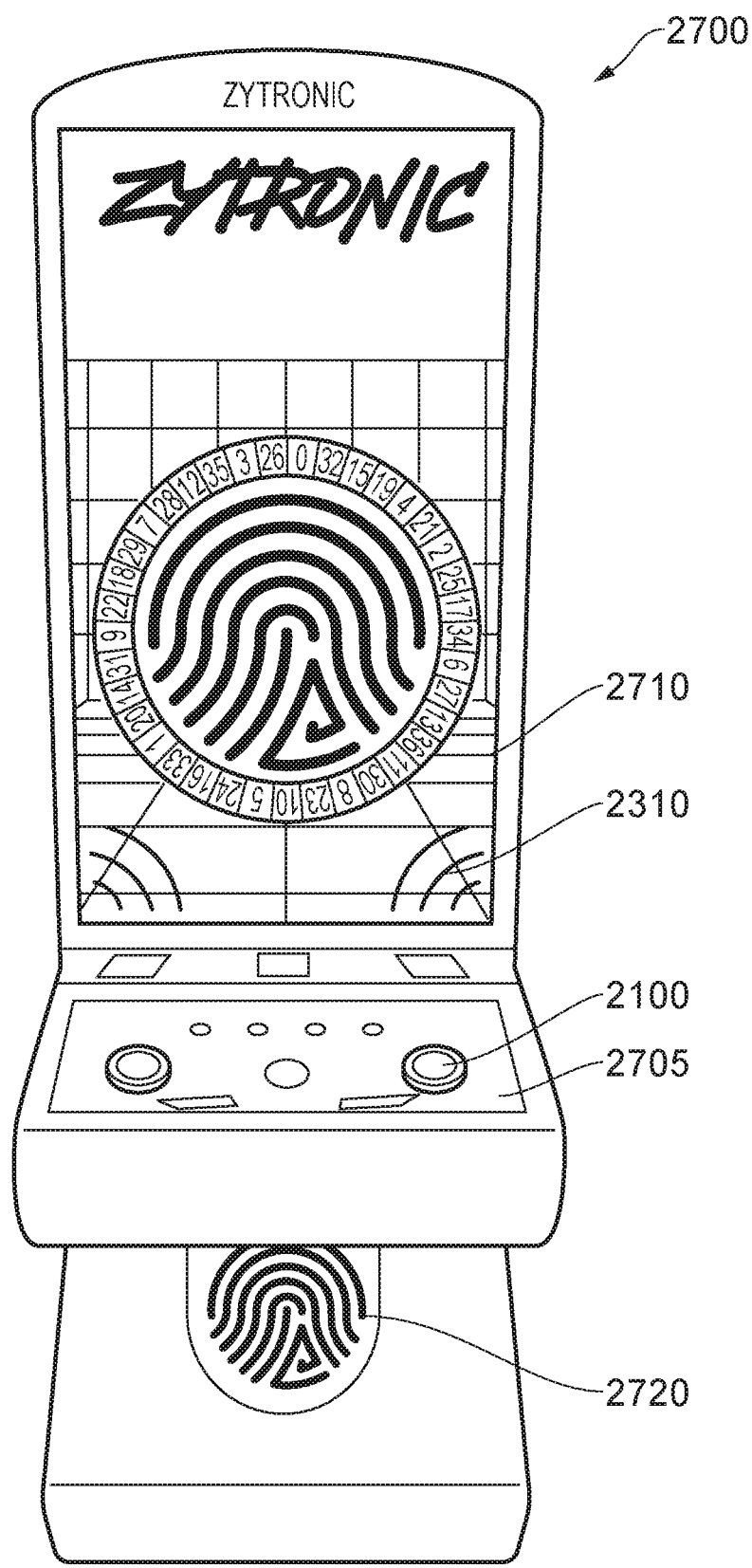

FIG. 5 schematically illustrates touch electrodes and a touch controller and connection to a host computer in more detail;

FIG. 6 illustrates a grid of intersection points;

FIG. 7 illustrates non-excluded cells around a round hole;

FIG. 8 illustrates prohibited areas in a virtual field that is correlated to the active area;

FIG. 9 illustrates touch electrodes and electrical connectors around a square through hole in a glass panel of a touchscreen;

FIG. 10 illustrates touch electrodes and electrical connectors around a triangular though hole in a glass panel of a touchscreen;

FIG. 11 illustrates a mechanical user input device in the form of a button in a touch panel and an exploded view of that button;

FIG. 12 illustrates connection to the button shown in FIG. 11 in more detail;

FIG. 13 illustrates various layers during manufacturing before a button is mounted to the substrate;

FIG. 14 illustrates an alternative user input device that is releasably mountable at the touch panel;

FIG. 15 illustrates an exploded view of a releasably mountable user input button;

FIG. 16 illustrates apparatus for mounting a releasably mountable user input button;

FIG. 17 illustrates an exploded view of apparatus for providing a releasably mountable user input button at a touch panel, viewed from the top side of the touch panel;

FIG. 18 illustrates a top view and cross-section views of a releasably mountable user input button provided at a touch panel;

FIG. 19 illustrates two hand actuated tool for releasably mounting a user input button;

FIG. 20 illustrates a schematic of circuitry for providing a user input button at a touch panel;

FIG. 21 illustrates a user input button in combination with an electronic device in the form of a ring of LEDs;

FIG. 22 illustrates an exploded view of a user input button in combination with an electronic device at a touch panel;

FIG. 23 illustrates a schematic including circuitry for providing power and/or data to a user input device and electronic device at a touch panel;

FIG. 24 illustrates a schematic including circuitry for providing power and/or data to one or more electronic devices at a touch panel without any through hole in the touch panel;

FIG. 25 illustrates a method of providing an electronic device in an active region of a touch panel;

FIG. 26 illustrates a gaming machine comprising a touch panel and a combination of a user input button and an electronic device, provided at the touch panel; and FIG. 27 illustrates a gaming machine comprising a touch panel and a combination of a user input button and an electronic device, provided at the touch panel.

In the drawings like reference numerals refer to like parts.

Throughout this description reference will be made to a display. A display is configured to display a graphical user interface (GUI) which provides user information to a user. The display device may optionally be a monochrome display, colour display and may optionally be a liquid crystal display (LCD), organic light emitting diode (OLED) display, quantum dot display or the like.

Reference is also made herein after to a transparent touch panel. In this sense transparent means that a human user effectively sees wholly through the panel. This can be achieved by utilising very thin electrodes such as very fine small diameter wires or substantially transparent material such as ITO or the like to generate electrodes which are provided on a side of a clear substrate of the panel. The net effect is that a human user can see displayed information through the sensing and drive electrodes unhindered.

A touch panel of a touchscreen recognises an actual touch or touches as a touch event or multiple touch events on a surface of the touch panel and thereafter outputs signals representative of this information to a host device. The host device can be a computer such as a desktop, hand held or tablet computer or laptop. The host device performs an action based on the touch event.

Figure 1:
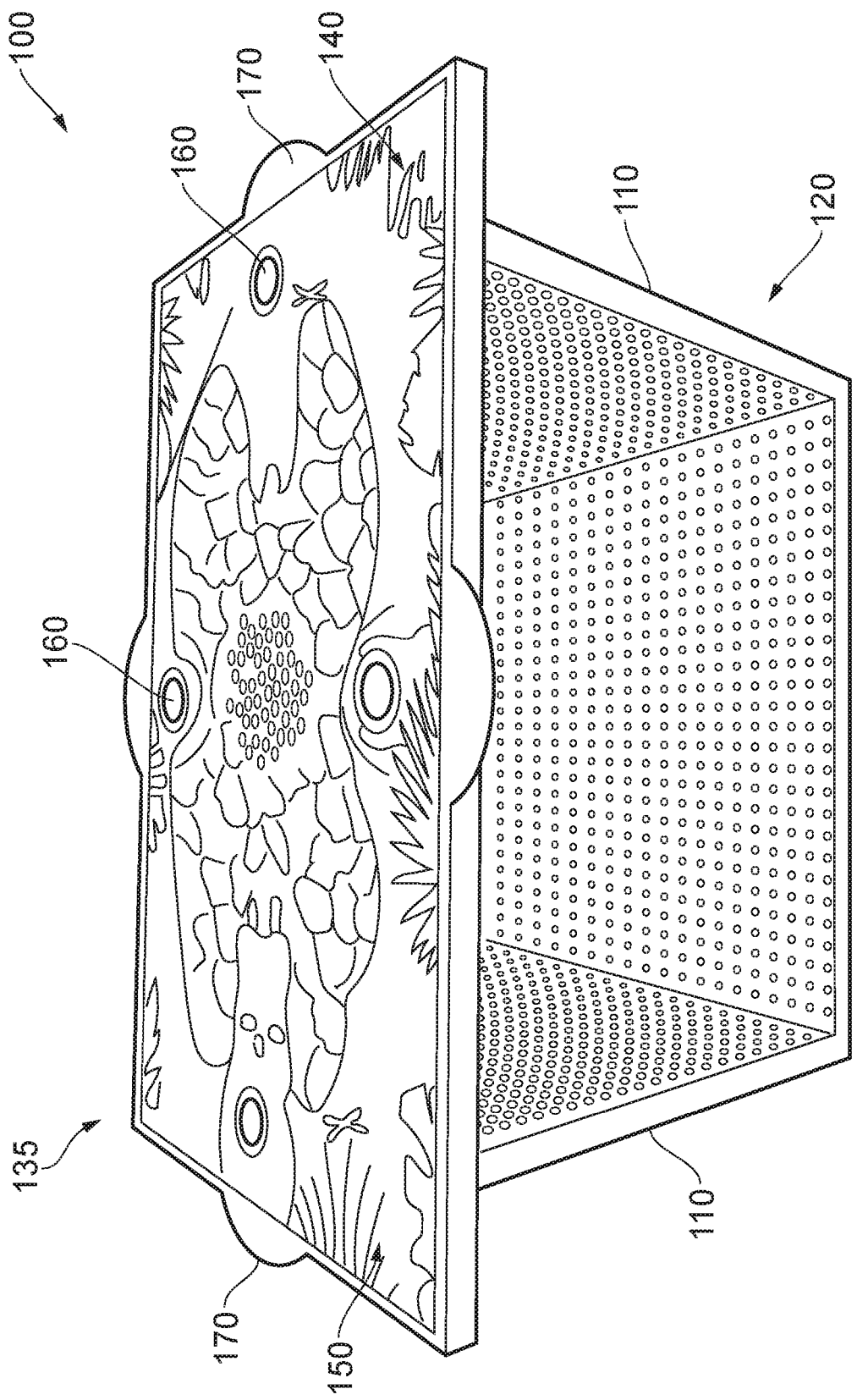
FIG. 1 illustrates an arcade game machine with a touchscreen that includes multiple mechanical buttons within an active area.

FIG. 1 illustrates a table top arcade game machine 100. The arcade game machine 100 is an example of a device with which certain embodiments of the present invention can be utilised. Other such machines include information kiosks, ATMs, industrial machines or displays or gaming machines or the like.

The arcade game machine 100 includes legs 110 which form part of an illuminated cabinet 120 which stands on a floor surface 130 and spaces an upper playing surface 135 from the floor 130. The upper gaming surface 135 is provided by a touch surface 140 of a touchscreen 150. The touchscreen 150 includes a touch panel and an underlying display.

In the arcade game machine shown in FIG. 1 an active area associated with the touchscreen has four spaced apart buttons 160 located at the centre of each of the four edges of the generally rectangular touchscreen. It will be appreciated that certain embodiments of the present are not limited in terms of the shape and size of touchscreen utilised nor the location of any mechanical user input device such as the buttons within that touchscreen. For example, buttons may be aligned along a common edge or, as shown in FIG. 1, at different edges or indeed alternatively or additionally in corner regions or in a central region of a touchscreen.

The arcade game machine 100 shown in FIG. 1 also has four user rests 170 which extend outwards as ears from the upper surface and on which a user can rest their elbows or arms or a beverage. Likewise, the arcade game machine shown in FIG. 1 has an illuminated region under the touchscreen which enhances the aesthetic appeal of the machine. It will be understood that whilst the arcade game machine 100 shown in FIG. 1 has a display area which extends substantially across the whole of the upper surface of the machine certain other embodiments of the present invention could be formed with a touchscreen which forms only a portion of an upper surface enabling remaining regions of the upper surface to be used for other purposes and/or to display other imagery. Likewise, the touchscreen could be vertical or angled with respect to the floor.

As illustrated in FIG. 1 each button includes transparent centre portions so that the buttons themselves which sit over a display of the touchscreen act as light guides. In this way imagery displayed via a display of the touchscreen can be communicated to a user of the arcade game machine 100. It will be appreciated by those skilled in the art that other types of button which do not act as light guides may of course be utilised according to certain other embodiments of the present invention.

Figure 2:
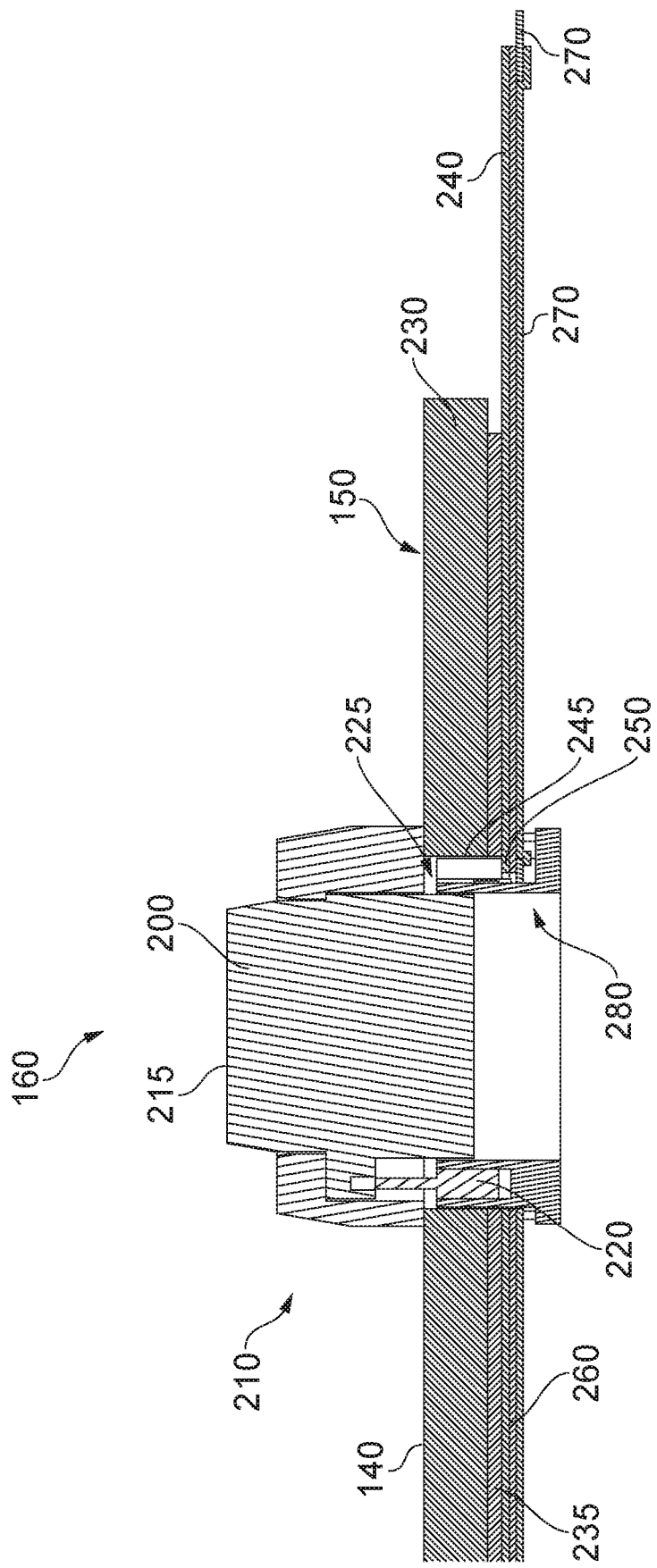
FIG. 2 illustrates a cross section through parts of a touchscreen showing a touch panel locatable over a display screen in which the touch panel incorporates a button.

FIG. 2 illustrates a region of the touchscreen 150 shown in FIG. 1 in more detail. In particular FIG. 2 helps illustrate a button 160 in more detail. The button is an example of a mechanical user input device. The button 160 includes a central moveable member or actuator 200 which is moveable with respect to a button housing 210. The top of the button actuator 200 has an upper surface 215 which can be pressed by a user which moves the moveable member with respect to the housing. In the cross section shown in FIG. 2 a micro switch 220 or other such switching element indicates pressing. Multiple switching elements may be arranged at different circumferential locations. The button 160 passes through a through hole 225 in a glass substrate 230 of the touch panel of the touchscreen. The substrate could be another rigid transparent material other than glass. A layer of adhesive 235 which is optically clear adhesive is provided on an under surface of the substrate 230. The upper surface 140 of the substrate (shown as upper in FIG. 2)

defines a plane which receives actual touches from a user wishing to interact with the touchscreen.

As illustrated in FIG. 2 a transparent film layer 240 is provided on the lower (in FIG. 2) surface of the adhesive layer 235. Part of this film layer 240 includes a though hole having an edge which is coincident with (and thus registration with) the edge 245 of the through hole 225 in the substrate. However, a tail like extension 250 of the film layer 240 extends beyond the edge 245 of the glass substrate and this provides a transparent support. The transparent support extends over at least a region of the through hole. The lower (in the orientation shown in FIG. 2) surface of the film layer 240 is provided with an adhesive layer 260 which includes plotted wires thereupon. The plotted wires provide touch electrodes for a touch panel of the touchscreen and also can be utilised to help provide a plurality of electrical connectors for the button (or other such user input device) secured at the through hole 225. A further film layer 270 covers the electrodes and adhesive. A first flexible cable 270 is provided at an edge to connect with the electrodes leading to a controller. A further flexible cable 280 connects to the electrical connectors provided by plotted wired which are interleaved with the plotted wires that form the touch electrodes and this further flexible cable 280 is connected to the micro switch or other switching element of the user input device that requires power supply and/or data transmission connection.

A grid of electrodes is thus provided on a lower surface of the substrate. The grid of electrodes is a grid of fine wires generated on an adhesive layer using a plotting technique. Aptly the wires have a diameter region of 4 to 40 microns. Aptly the wire diameter is 5 to 18 microns. Aptly the wires are coated with a thin electrically insulating material. It will be appreciated that according to certain other embodiments of the present invention the electrode grid could be created using other electrode forming techniques such as by deposition of an ITO layer or the like.

The touchscreen thus includes a relatively short effectively transparent flexible cable which connects the button output to a button controller. Unlike other prior art solutions this is far less visible to the naked human eye than has previously been possible. The button controller can be connected to the computer system host arcade game machine. A display (not shown) lies underneath the touch panel. In this way information displayed from the upper surface of the display can be seen by a human user through the touch panel located above the display. A user observing the displayed imagery or other such visual cues touches relative points on the upper surface of the touch panel and/or presses a button within the active area of the touch panel to thereby provide user input which effectively makes respective user selections.

Figure 3:
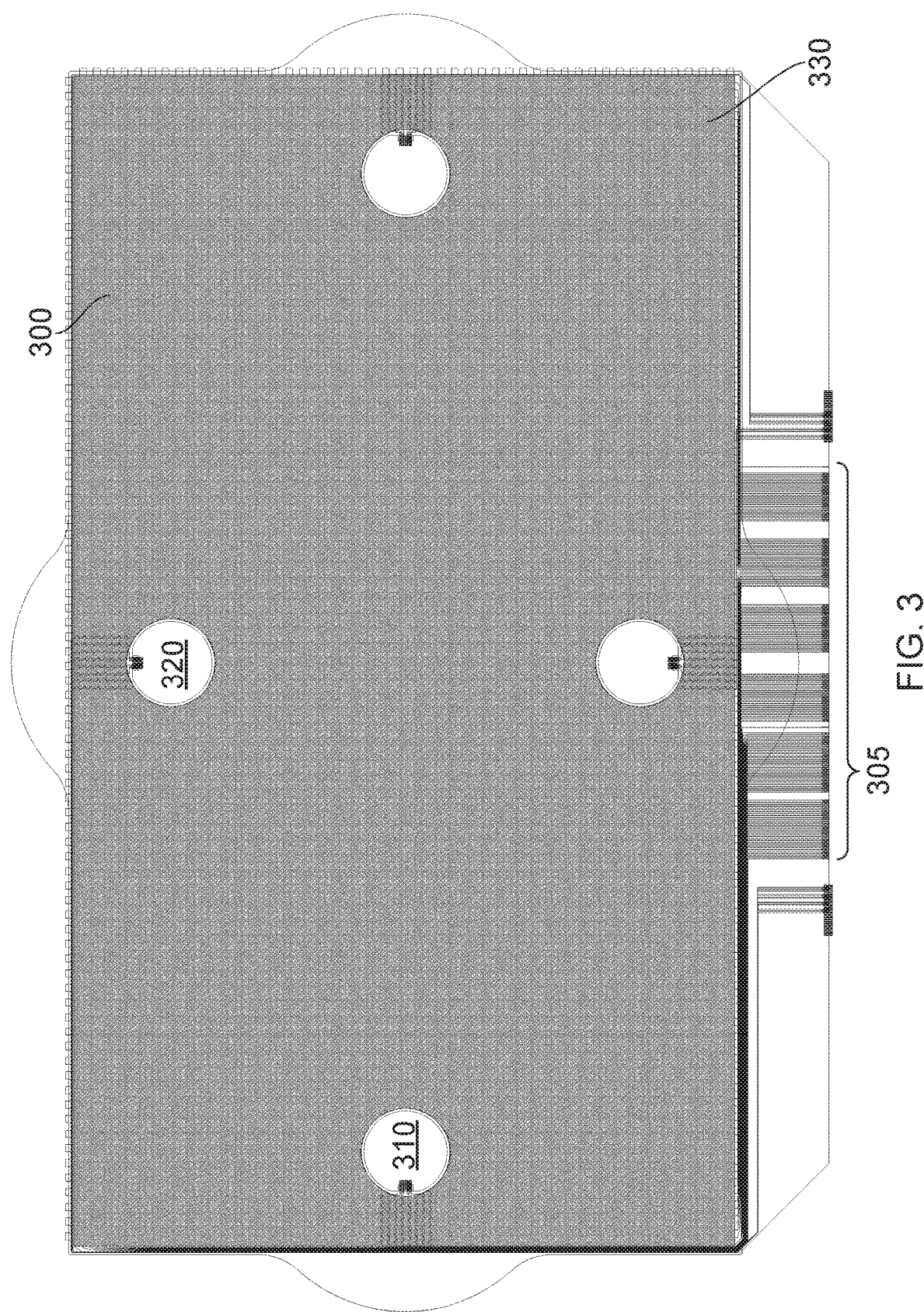
FIG. 3 illustrates drive electrodes and sensor electrodes and button electrical connectors and edge connectors for a touch panel.

FIG. 3 helps illustrate the grid 300 of electrodes arranged in a predetermined pattern for the touchscreen. The touch panel illustrated is a capacitive sensing touch panel and this includes touch electrodes which include drive electrodes and sensor electrodes accordingly which are driven and read via respective connectors 310. As illustrated in FIG. 3 all electrodes can be connected from a single side of the electrode grid meaning that a very thin surround only is required for the touch panel. It will be appreciated that other connectivity strategies could be utilised.

FIG. 3 helps illustrate how in addition to the wire sections that form the touch electrodes for the touchscreen other sections of wire are provided in a similar way which extend across the active area of the touchscreen and then around the edge of the active area to respective connectors. These wires are used to provide power and/or data communication with the mechanical user input devices located at the through holes of the touchscreen. In this way wire which is provided in the same way that wire for the touch electrodes is provided can be made use of for providing power and/or data input/output. Making use of such fine wires which are effectively invisible to the naked eye for a substantial amount of the connection vastly reduces the visibility of such connecting elements relative to prior art techniques. The sections of wire for the touch electrodes and/or the connectors may be provided by plotting a single wire in a long path and then subsequently cutting the wire in numerous locations to form separate sections.

As illustrated in FIG. 3 the touch electrodes have a pathway which does not pass through the area where the buttons 190, 195 are located. In this sense a first excluded zone 310 is associated with a through hole in the substrate 230 where the respective button 160 is located and a further excluded zone 320 is associated with another through hole through the substrate 220 where a further button 160 is located. As illustrated in FIG. 3 the pathway of the electrodes is different close to and immediately surrounding each excluded zone relative to the pathway which is otherwise followed by electrodes in regions of the active area of the touch panel where the buttons are not located. An inner region of the electrode array defines an active area 330 of the touch panel.

Figure 4:
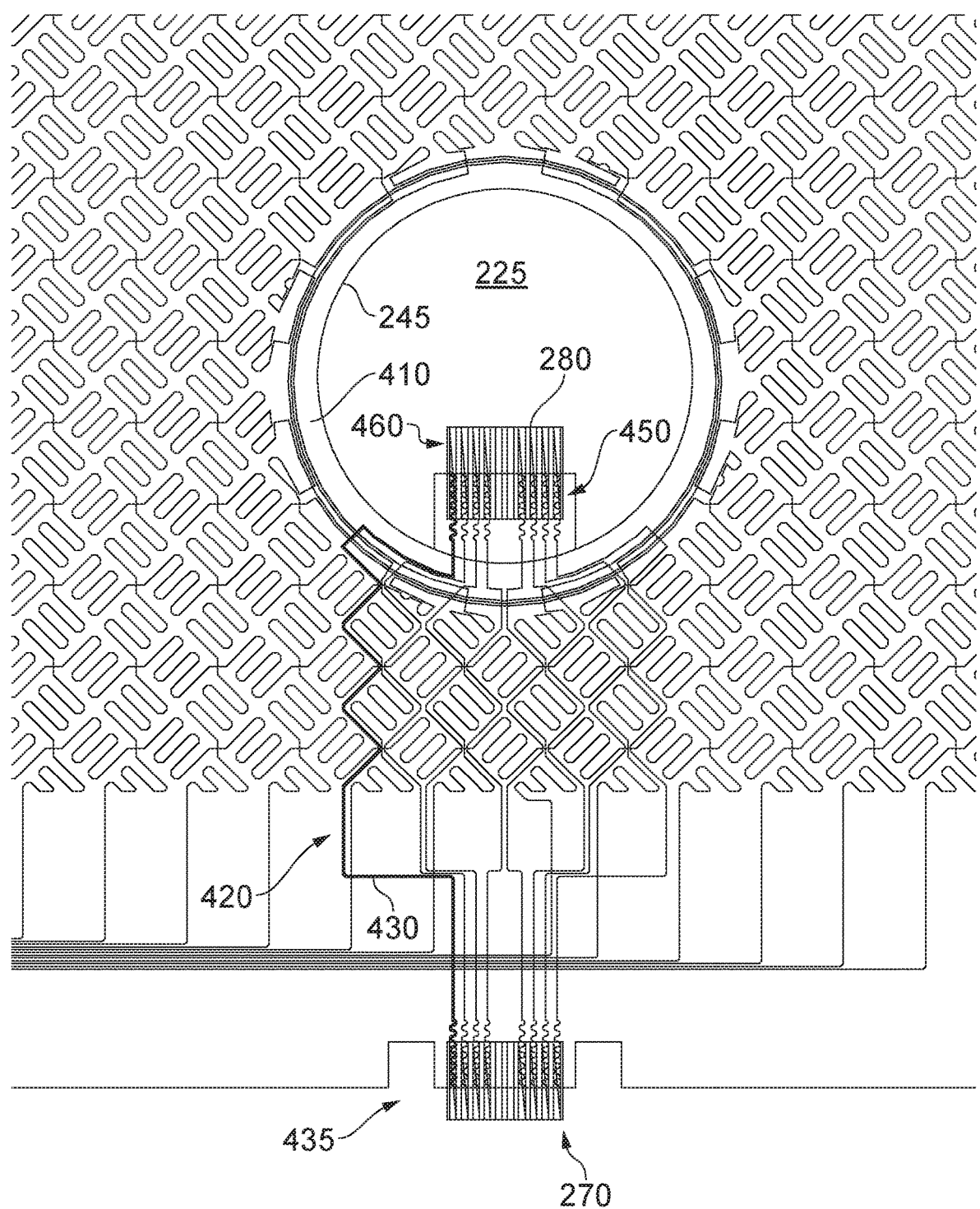
FIG. 4 illustrates touch electrodes as drive electrodes and sensor electrodes and electrical connectors that make use of plotted wire around a round through hole in a glass panel of a touchscreen in more detail.

FIG. 4 helps illustrate the pathway of electrodes surrounding a round hole in a touchscreen. In FIG. 4 the touch electrodes and electrical connection electrodes are shown terminating in an adjacent edge region for the sake of clarity. It will be understood that the skilled person will understand that once the plotted electrodes reach an edge region they may be fed directly off that edge region (in a manner similar to that shown in FIG. 4) or around an edge to a common edge region (in a manner more like that shown in FIG. 3).

FIG. 4 illustrates the edge 245 of a through hole 225 in more detail. A margin 410 is (for a round hole) a ring-like region which contains no touch electrodes and which immediately surrounds the edge of the hole. Aptly the margin is 1 to 3 mm wide. The drive electrodes and sensor electrodes which form part of the touch electrodes run approximately up and down vertically and left to right horizontally (in the orientation shown in FIG. 4). It will be appreciated that other orientations could be utilised according to certain other embodiments of the present invention. Whilst the touch electrodes do not encroach within the margin, wire associated with electrical connectors for the user input device does cross the margin where the wire extends over the surface of the tail-like extension 250 of the film layer 240 that provides the transparent support.

FIG. 4 illustrates a pathway 420 for one particular wire that helps provide an electrical connection for the button in more detail.

The pathway 420, which is shown highlighted (and thus broader than the other wires) in FIG. 4 is provided by a section of wire 430. The wire 430 has a first end region 435 at an edge of the touchscreen. At the first end region 435 the wire has a sinusoidal or other labyrinthine-like shape. This introduces an overlength of wire which helps overcome stress problems. A respective contact pad carried by a flexi tail connector 270 overlies and is secured in electrical contact with the wire. Since the wire 430 is plotted as an insulated wire the insulation should first be removed from the end region 435 of the wire prior to electrical connection with the contact pad of the flexi tail connector. As will be appreciated this can be achieved in a number of ways such as by soldering which burns off the insulating layer. The wire 430 is electrically connected to the flexi tail in this way and from the flexi tail a connection can be made to the onboard controller of the host machine. The wire 430 then takes a pathway in a linear fashion away from the flexi tail at the edge towards the through hole in the button. The pathway 420 then turns around 90° to the left (in the orientation shown in FIG. 4), continues forward for a portion and then turns right by around 90° leading towards the area where touch electrodes are provided. The pathway then extends from the region where the touch electrodes begin towards the margin surrounding a through hole. Each time the wire 430 is to pass over (or under), a wire that forms part of a touch electrode the pathway 420 turns so that adjacent wires pass in a substantially orthogonal manner. This helps reduce undesired coupling or interference effects. Close to the margin 410 the wire 430 turns and passes over (or under) the touch electrodes which have a pathway that circumvents the through hole. From there the wire 430 turns generally towards a centre of a through hole region where it passes across the margin area to terminate in another end region of the wire 430 which again is sinusoidal (or in some other way labyrinthine) so as to introduce an over length of wire. The wire here is provided over a transparent support 250 provided by a tail-like extension of the layer 240 which carries an over surface of adhesive. A short flexi tail 280 which includes contact pads can be electrically connected to the end of the electrical connector wire 430. In this way one end region 450 of the flexi tail 280 is secured to respective ends of any electrical connector and a remaining end region 460 of the flexi tail 280 can be connected to the button.

Each drive electrode and sensor electrode of the electrode grid follows a repetitive labyrinthine pathway. Each drive electrode crosses a sensor electrode at a respective crossing point 450 and each crossing point 450 defines a centre of a respective cell having a respective cell index of the touch panel. As illustrated in FIG. 4 the drive electrode and sensor electrode shown have a crossing point that defines a respective centre of a cell which is offset from a position where it would otherwise be located had the hole in the substrate not being positioned where it is, the electrode grid thus not being disturbed. Because of this off set position there is a risk that a touch would be identified in an incorrect position.

As illustrated each touch electrode follows a labyrinthine pathway via two convoluted pathway portions separated by a substantially straight pathway portion (where a crossing point with another electrode occurs) and then from the second convoluted pathway portion the pathway of the electrode turns substantially perpendicular to the edge close to the touch electrode. The pathway then immediately turns around 90° left and then tracks around the aperture maintaining a predetermined distance away from the edge 400. When the circumventing pathway portion which is substantially parallel to the edge of the hole reaches a point corresponding to the point where it turned to track the edge, the pathway turns outwards substantially perpendicular to the edge local to the turning point and then follows a short pathway portion running perpendicular to the local edge region. After that straight portion has run for a predetermined distance the electrode pathway returns to the common repeated electrode pathway. That is to say adopts an undisturbed pathway similar to other pathways followed by touch electrodes not proximate to a hole. Each touch electrode pathway has a shape which matches an undisturbed electrode pathway pattern to a point which is a predetermined distance away from an edge 400 of a hole. Aptly this distance is about 6 mm from a hole edge. Aptly the distance is between 3 and 7 mm from an edge of a hole in the aperture.

The 8 electrodes at the button end are terminated to a set of 8 pads (a small FPC tail which consists of a set on copper pads plated with ~8 µm+/−4 µm tin to allow the copper wire electrode to be soldered (laser, hot bar bonded or hand soldered) and terminated to the pads. The 8 pads are then shorted together in two banks of four. At the other end of the bank of 8 electrodes, located at the perimeter of the touch sensor the 8 pads are also shorted together in two banks of four using solder to create effectively two over all fat tracks (A and B) that go to and from the button. The idea of shorting multiple track together is to reduce the overall resistance of the electrodes to and from the buttons to aid with the driver electrodes and current flowing to and from the buttons. The flexi tails at the perimeter of the sensor would then be connected to some controller electrodes that would supply power and monitor data to and from the mechanical buttons. Any desired number of distinct pads/wires could of course be utilised according to use.

The flexi pads at the mechanical button end are connected to a set of three micro switches within the mechanical button construction. These micro switches are wired in parallel with electrode connections B terminating to all the top ends of the micro switches and connection A connecting to all the bottom ends of the micro switches. Typically, an external electronic controller would supply a voltage (typically 5V) to contact B and contact A would be at ground potential. Depressing any of the microswitches will cause the voltage between the two contacts to be shorted to ground and a physical depress of the switch would thus be registered by the controller electronics, this in turn would generate a button depress function within the user GUI interface. There are multiple (three shown) micro switches around the button to ensure if the button is rocked up down or left or right a switch activation or multiple activations would be read.

FIG. 5 schematically illustrates the grid with crossing points of sensor electrodes and drive electrodes providing respective capacitive nodes associated with a cell centre. GB2502601, the disclosure of which is incorporated herein by reference, discloses a suitable plotting technique for providing the electrode grid and electrical connection wires and aspects of a controller unit usable according to embodiments of the present invention. In more detail FIG. 5 provides a schematic diagram illustrating components of a touch detector unit 500. The touch detector unit 500 is connected to a multi-touch touch panel 502 comprising X-plane and Y-plane insulated conducting wires via a flexi-tail connector (not shown in FIG. 5).

The touch detector unit 500 includes a level generation circuit 503 that generates a voltage pulse signal which is input to a multiplexer 504 connected, via the flexi-tail connector, to the X-plane insulated conducting wires of the multi-touch sensing panel 502. The multiplexer 504 selects one of the X-plane insulated conducting wires and sends the pulse signal generated by the level generation circuit 503 to the selected X-plane insulated conducting wires. Energy from the voltage pulse signal is transferred to the Y-plane insulated conducting wires of the multi-touch sensing panel 502 by capacitive coupling.

The Y-plane insulated conducting wires are connected via the flexi-tail connector to one of a number of multiplexes A, B, C in a multiplexer array 505. Each multiplexer is connected to a respective receive circuit 506A, 506B, 506C. On the transmission of a voltage pulse signal on an X-plane insulated conducting wire, each multiplexer of the multiplexer array 505 is arranged to connect each Y-plane insulated conducting wire to which it is connected to the receive circuit 506A, 506B, 506C to which it is connected. In this way a complete scan of the multi-touch sensing panel is performed.

As illustrated in FIG. 5 in more detail each receive circuit 506 comprises an amplifier 507, a peak detector 508, peak detector charge and discharge switches 509, 510 and an analogue to digital converter 511. The process includes measuring the voltage pulse signal on each Y-plane insulated conducted wire and outputting as a digital value to the microprocessor 512. Eventually a digital value is sent to the microprocessor 512 for all of the intersection points of the multi-touch sensing panel 502.

Once all the digital values corresponding to the voltage pulse on each Y-plane insulated conducting wire has been input to the microprocessor 512, the microprocessor converts these values into a suitable format and then outputs multi-touch data corresponding to detected multiple user touches on the multi-touch sensing panel 502 on an output line 513.

Optionally the microprocessor performs further processing to refine the data received from the received circuits prior to outputting data to a host computer system. For example the microprocessor may have access to memory holding an up to date list of excluded cells. Aptly this list is set on manufacture. If the microprocessor determines that a touch has been received at a cell having an index which is an index currently listed in a list of excluded cells the microprocessor ignores this as a touch and does not indicate a touch. In this way according to certain embodiments of the present invention the microprocessor can accommodate the fact that there are holes within the active area of the multi-touch sensing panel 502. Alternatively the microprocessor has access to a virtual field having a corresponding area corresponding to the active area of the touch panel. Data for the virtual field is stored in memory and includes one or more prohibited areas which correspond to locations on the active area of the touch panel where buttons or other user input devices are located. The granularity of the virtual field is high. That is to say the virtual field has many identifiable locations so that each prohibited area can be a finely-defined shape having any desired outline. The virtual field and associated prohibited areas are stored in a memory 520 associated with the microprocessor and accessible by it. In this way the microprocessor can determine possible touches and then compare the possible touches with the prohibited areas of the virtual field. If an interpolated touch falls within a prohibited area in the virtual field the microprocessor ignores this as a possible touch event.

FIG. 6 helps illustrate cell indexes A1 . . . J10 associated with the crossing points of drive electrodes 1 . . . 10 and sensor electrodes A . . . J.

FIG. 7 helps illustrate cell indexes in a region around a circular hole.

FIG. 8 helps illustrate how a virtual field that is correlated to an active area of a touchscreen can include prohibited areas (two shown in FIG. 8). Each prohibited area corresponds to a region of the touchscreen where a user input device is located and which cannot provide a touchscreen input signal. The granularity of the virtual field is high meaning that a prohibited area can have a wide variety of shapes which can thus define excluded zones for a wide variety of shaped user input devices.

A mechanical button could be any shape or size. The touchscreen electrodes are formed around the shape of the mechanical button cut out in the glass touch sensor to achieve touch activation around the mechanical button hole. Examples of square and triangular shaped holes for square or triangular mechanical buttons and their associated touch electrodes and button data/power electrode patterns around these devices are highlighted in FIGS. 9 and 10 respectively.

FIG. 11 illustrates a button 160 in a round format mounted to the glass substrate and illustrates the touch sensitive surface 140 of the substrate. FIG. 11 help illustrates the components of the button in an exploded format. The button includes a fascia member 1100 which surrounds the moveable part of the button. This may be transparent or may be patterned in some way. For example, a mirror-like coating may be applied. Multiple threaded inserts (six shown in FIG. 11) are secured on an underside of the fascia 1100. Each threaded insert 1120 is secured on the under surface of the fascia member.

The button body 200 is a user movement member between the fascia member 1100 and a base member. The user movement member has an upper surface 215 which a user can press to move the body. The body has radially outwardly extending ears 1125 (three shown) that help avoid the button body falling out of the assembly. The body can be a transparent material and can be manufactured to have a cross section to provide a lensing effect. This helps steer illumination from the display in a way so that a human observer appears to see the display on or near the top surface region of the button.

FIG. 11 illustrates a cut away section, for example only, of the glass substrate 140 and shows the shape and location of a through hole 225. This may have a slightly flattened circumferential edge region in one position. The flattened edge 1130 helps provide a run off point for electrodes which extend from the substrate over the transparent support.

A gasket 1140 is provided on a reverse side of the substrate to help prevent ingress of contaminants and fluids. A set of micro switches 220 (three shown in FIG. 11) are provided and connected by respective wires. Two ends of inner button wires are located at a break in the circle of wiring. The two ends are opposed but spaced apart. Their position and use is shown and described in more detail in FIG. 12.

The button also includes a base and screws (six shown in FIG. 11). The screws 1150 pass through corresponding openings in the base 1160 and engage through the through hole in the substrate into the threaded inserts 1120. By tightening the screws this pulls the button assembly together and holds it in place at the through hole.

FIG. 12 illustrates how the three micro switches 220 are interconnected via wires so that should any one micro switch change state due to a push this will be identified as a button push and consequentially can be used to indicate a user selection. The wires have an electrically conductive core which in FIG. 12 is revealed at an end 1200 of one of the end wires 1205. The revealed section is secured to the four pads on the connector and can be used to short those pads together. A remaining end 1210 of a further wire 1215 is likewise used to short together four pads to thereby provide a first bank A and further bank B of contacts. This helps reduce resistance in the pathway of the connector.

FIG. 13 illustrates the glass substrate and various layers shown in FIG. 2 before a button is mounted.

Various construction techniques can be utilised for providing the touch electrode and connector electrode and electrical connections. One possible construction process is described below:

1. Using a roller lamination process, apply a layer of optically clear PSA (with protective release liner) over the rear surface of the glass, stepped back from the controller connection side edge by ~4 mm, and overhanging slightly on the other three edges.
2. Use a blade to trim the PSA back to the edge of the glass holes, and to the glass edge on the three sides without the stepped in PSA.
3. On a laminating board, position a plastic frame/jig of the same thickness as the glass around the perimeter of the glass on all four sides. After removing the protective release liner from the first layer of PSA, use a roller lamination process to apply a layer of optically clear film and optically clear PSA (with protective release liner) over the rear surface of the glass/PSA, overhanging onto the frame/jig by ~100 mm on the controller connection side edge and overhanging onto the frame/jig by ~50 mm on the other three edges.
4. With the glass laminate and plastic frame/jig positioned on a wire plotting machine with temporary filler blocks of the same thickness as the glass fitted within the glass holes, use tape to secure the plastic jig/frame to the bed, and to secure the overhanging optically clear film and optically clear PSA to the plastic jig/frame. Lay down touch sensor electrode wires and button electrical connection wires in a single plotting process. Button electrical connection wires run to flexible cable connection areas outside of the touch active area on the ~100 mm overhanging optically clear film and optically clear PSA section on the controller connection side edge at one end, and to flexible cable connection area on the optically clear film and optically clear PSA over the filler blocks in the glass holes at the other ends. Touch sensor electrical connection wires run to flexible cable connection areas outside of the touch active area on the ~100 mm overhanging optically clear film and optically clear PSA section on the controller connection side edge.
5. Lift, cut back, and reposition the cut off section of the protective release liner at the flexible cable connection areas outside of the touch active area on the ~100 mm overhanging optically clear film and optically clear PSA section on the controller connection side edge, such that the plotted wire connection areas are exposed. Attach flexible cables with tin plated pads, aligning the tin-plated pads to the plotted wire connection areas.
6. Make electrical connections between the wires and flexible cables at the connection areas outside of the touch active area on the ~100 mm overhanging optically clear film and optically clear PSA section on the controller connection side edge using a laser reflow soldering process.
7. For each of the glass hole positions, trim down the film/PSA to form a tab with the required final length and a few millimetres wider than the final width, and trim the excess film/PSA from the glass hole.
8. Lift the protective release liner at the tab positions, and attach flexible cables with tin plated pads to the film tabs, aligning the tin-plated pads to the plotted wire connection areas. For each of the glass hole positions, trim down the film/PSA to form a tab with the required final length and a few millimetres wider than the final width, and trim the excess film/PSA from the glass hole.
9. Lift the protective release liner at the tab positions, and attach flexible cables with tin plated pads to the film tabs, aligning the tin-plated pads to the plotted wire connection areas.
10. Using a roller lamination process, remove the protective release liner and apply an encapsulating layer of optically clear film PSA over the whole glass and overhanging film PSA (covering the glass holes and film tabs with flexible cables).
11. Trim the film around the glass hole and cut the tab to the final width, cutting the film shorter than the tab length to expose part of the rear (non-tin side) of the flexible cable connection area.
12. Make electrical connections between the wires and flexible cables on the tabs at the hole positions using a manual reflow soldering process.
13. Use a blade to trim the film/PSA/film to its final size on the ~100 mm overhanging section on the controller connection side edge, and back to the glass edge on the other three sides.

Other construction methods are also possible as will be appreciated by those skilled in the art.

FIG. 14 illustrates an example of apparatus 1400 for releasably mounting a user input device at a touch panel 1405. The apparatus comprises a user input device such as a user input button 1410 and a mounting collar 1420. The mounting collar may further comprise an upper collar member and a lower collar member (not shown).

The user input button 1410 includes a button housing 1430 and a user movement member 1440. The button housing has a ring like body for providing space for the user movement member to respond to input from a user. The button housing 1430 further comprises at least one recess 1450 in an outer surface of the button housing. The at least one recess 1450 may provide a hole through the housing body. Optionally, the user movement member is transparent so that information displayed on a display screen proximate to the touch panel 1405 is visible through the user input button 1410.

One or more securing elements (not shown) may be provided partially within the housing body and in alignment with the at least one recess 1450, such that a portion of the securing element protrudes from the housing body. The securing element is configured to engage with a recess in the mounting collar 1420 for securing the user input button 1410 to the mounting collar 1420.

FIG. 15 illustrates an exploded view of an example embodiment of the user input button 1410. The button housing 1430 is shown in two parts including a base member 1510 and a fascia member 1520. A portion of the recess 1450 in the button housing 1430 is shown in the fascia member 1520 and the base member 1510. Upon assembly of the user input button 1410 portions of the recess 1450, provided in the base member 1510 and the fascia member 1520, align to provide a recess through the button housing 1430.

A plate member 1530 may be provided between the base member 1510 and the fascia member 1520. Optionally, a gasket may be provided for preventing ingress of fluid into the user input button 1410. User input devices provided at a gaming machine may be susceptible to damage by spilled drinks. The plate member 1530 may be located on the gasket.

The plate member 1530 in the example shown in FIG. 15 is a printed circuited board including one or more switch elements 1540. Optionally, the switch element 1540 may be provided on or as part of the base member 1510. The switch element 1540 is located in a position where it can be actuated by the user movement member 1440. In the example embodiment shown, actuation of the switch element 1540 by the user movement member 1440 is provided by one or more tab elements 1550 of the user movement member 1440. The user movement member 1440 is responsive to input from a user. In the example embodiment, when a user presses down on the user movement member, at least one biasing element 1560, such as a spring, is urged until the tab element 1550 actuates the switch element 1540. When a user then releases the user movement member, the biasing element 1560 urges the user movement member back to a neutral position, disengaging the switch element 1540. One or more recesses may also be provided in the fascia member 1520 for locating and aligning the tab element 1550 with the switch element 1540.

FIG. 16 illustrates an exploded view of the mounting collar 1420 at a through hole in the touch panel 1405. The touch panel 1405 is shown with tab portions 1610 extending into the through hole of the touch panel 1405. Each tab portion 1610 comprises at least one electrical contact pad connected to an end region of at least one plotted wire of the touch panel 1405. The at least one wire provides one or more electrical connectors for providing power and/or data to the user input button. It will be appreciated that multiple through holes may be provided in the touch panel with respective user buttons with respective mounting collars etc in each. The printed circuit board 1530 may further include pins on a lower surface that each contact a respective electrical contact pad on each tab portion 1610.

The mounting collar 1420 comprises a lower collar member 1620 and an upper collar member 1630. Optionally, the upper and lower collar members 1620, 1630 are made of metal, plastic, ceramic, composite or a combination thereof. The lower collar member 1620 is locatable proximate to the through hole on a lower surface of the touch panel 1405. In the embodiment of the mounting collar 1420 shown, the lower collar member 1620 comprises a number of separated ridge portions, which arc circumferentially to fit to an inner surface of the through hole in the touch panel 1405. Optionally, the separated ridge portions provide a press fit type securement between the touch panel 1405 and the lower collar member 1620. Optionally a glue or resin may be added to the lower collar member for securing the lower collar member 1620 to the touch panel 1405. Spacings between the separated ridged portions of the lower collar member 1620 provide space for the tab portions 1610 when the lower collar member 1620 is secured to the touch panel 1405.

The upper collar member 1630 is locatable proximate to the through hole on an upper surface of the touch panel 1405. The upper collar member 1630 shown in FIG. 16, comprises grooved portions that provide clearance for access by the user input button to contact pads on the tab portions 1610. The upper collar member 1630 further comprises one or more recesses for securing a user input button 1410 to the mounting collar 1420.

FIG. 17 shows an exploded view of the apparatus 1400 for releasably mounting a user input button 1410 at a touch panel 1405, viewed from the top surface of the touch panel 1405. Fastening elements 1710 for holding the user input button 1410 are shown, along with securing elements 1720 for releasably securing the user input button 1410 to the mounting collar 1420. Optionally, a disc member 1730 is disposed in the centre of the upper collar member. The disc member helps to prevent ingress of fluid into a gaming machine via the user input button 1410 and helps to prevent components that may come loose from the user input button 1410 from dropping through the through hole of the touch panel 1405.

FIG. 18 illustrates A) a top view of the user input button 1410 at a touch panel 1405; B) a magnified cross-section view of a portion of the user input button 1410 secured to the mounting collar 1420 at a touch panel 1405; C) a cross-section view of the user input button secured to the mounting collar 1420 at a touch panel 1405; and D) a cross-section view of the user input button secured to the mounting collar 1420 at a touch panel 1405, including a cross-section view of at least one hand actuated tool member for releasably mounting the user input button 1410 to the mounting collar 1420. The top view (A) shows at least one switch element 1540 in the user input button and at least one recess 1450 in the button housing. The at least one recess 1450 is configured to receive an elongate pin element of a hand actuated tool member.

The cross-section view (B) shows a securing element 1810 disposed partially within the user input button 1410. A further portion of the securing element 1820 is located in a recess of the mounting collar 1420, thereby securing the user input button 1410 to the mounting collar 1420.

The cross-section view (C) shows the user input button 1410 secured to the mounting collar 1420 by at least two securing elements disposed opposite each other across the through hole of the touch panel 1405. In the example embodiment four securing elements 1810 and recesses 1450 are disposed in the user input button 1410. Optionally, fewer or greater numbers of securing elements 1810 and recesses 1450 may be provided in the user input button 1410.

The cross-section view (D) shows the user input button 1410 being mounted to or released from the mounting collar 1420 using at least one hand actuated tool member 1820. The example of the hand actuated tool member 1820 shown in FIG. 18, comprises at least one elongate pin element. In the example shown each tool carries two substantially parallel spaced apart pins. The at least one elongate pin element is inserted into the recess 1450 of the user input button 1450. Once inserted, the elongate pin element urges the further portion of the securing element 1810 from the recess in the mounting collar member 1810. By displacing the further portion of the securing element 1810 from the recess of the mounting collar 1420, the user input button is released and can thus be removed from the mounting collar 1420.

Likewise, the user input button 1410 can be mounted to the mounting collar 1420 by positioning the user input button 1410 on the mounting collar 1420 with the hand actuated tool member 1820 to displace the securing element 1810, thereby locating and securing the securing element 1810 in a recess of the mounting collar 1820 as the elongate pin element of the hand actuated tool member 1820 is removed from the recess in the user input button 1410. The securing element 1810 includes a hooked end, which is biased towards the radially outer edge of the user input button 1410. Displacing the securing element 1810 with a pin of the hand actuated tool member 1820 urges the securing element radially inwards towards the centre of the user input button 1410. This displacement allows the hooked end of the securing element to be removed from the recess in the upper collar member. Once the user input button 1410 is located on the upper collar member, removal of the pin and hand actuated tool member 1820 allows the biased hooked end to return to a neutral position, thereby locating the hooked end of the securing element 1810 into the recess of the upper collar member.

FIG. 19 illustrates two hand actuated tool members 1820. Each hand actuated tool member 1820 comprises a handle portion that can be grasped by a user and at least one elongate pin element 1910. In the example shown, each handle supports two pins 1910. The handle portion may be positioned offset from or at an angle to the elongate pin element 1910 to provide clearance between the handle portion and the touch panel 1405 during operation. In the example scenario illustrated, two hand actuated tool members 1820 are used for releasably mounting a user input button 1410 at a touch panel 1405.

FIG. 20 illustrates a schematic of an example circuit for the user input button 1410. The schematic shows how switch elements 1540 are connected to electrical contact pads 1610, which in turn are connected to end regions of electrodes 2000 of the touch panel. When the user input button 1410 is secured to the mounting collar 1420, conductive elements 2010 make electrical contact with the electrical contact pads 1610. Three switches are shown in the example embodiment. Optionally, more than or less than three switches may be used.

FIG. 21 shows a combination of a user input button and electronic device 2100. In the example shown, a plurality of LEDs is provided in the housing of the user input button. FIG. 21 also illustrates a transparent movement member to allow information displayed on a display screen below the button and touch panel to be visible to a user.

FIG. 22 shows an exploded view of the combination user input button and electronic device 2100 at a respective through hole in a touch panel 2205. The combination device 2100 includes a fascia member 2210 and a base member 2220. A recess is provided in a top surface of the fascia member body. At least one switch element 2230 is locatable on the base member. The base member 2220 and switch element 2230 are shown disposed proximate to the through hole on a lower surface of the touch panel 2205. The base member 2220 comprises at least one ridged portion configure to provide a press fit with an inner surface of the through hole in the touch panel 2205. A user movement member 2240 is provided between the switch element 2230 and the fascia member 2210. The user movement member includes at least on tab element for actuating the switch element 2230.

At least one electronic device 2250 may be provided in the recess in the top surface of the fascia member 2210 body. In the example shown in FIG. 22, a printed circuit board comprising at least one addressable RGB LED (in the form of a ring of LEDs) is located in the recess of the fascia member 2210. A cover member 2260 is provided on the top surface of the fascia member 2210. The cover member 2260 may be transparent. Optionally, the cover member 2260 is a diffuser. Fasteners are provided from the lower side of the touch panel, through the base member 2220 for holding the combination device 2100 together and securing the combination device 2100 to the touch panel 2205.

Power and/or data is provided to the combination device 2100 via electrodes in the touch panel 2205 to electrical contact pads 2270 extending into the through hole in the touch panel 2205. Each electrical contact pad 2270 may be connected to an end region of a plurality of electrodes in the touch panel. By connecting a plurality of electrodes to each contact pad, current required to power the combination device 2100 can be distributed across the plurality of electrodes. This is advantageous because thin wires can still be used in the touch panel to provide power and/or data in order to give the appearance that the combination device 2100 is floating.

FIG. 23 illustrates a schematic of an example circuit for providing power and/or data to a combination device 2100 via electrodes of a touch panel 2205. Power and/or data is provided to electrical contact strips 2305 at the touch panel from an external device via a flexi-tail connector. Examples of an external device include a power supply, a signal modulator, or touch controller or the like.

A plurality of discrete electrodes 2310 may be provided in the touch panel to connect each electrical contact strip 2305 to a corresponding electrical contact pad 2270 at the through hole of the touch panel 2205, thereby enabling power to be provided to the combination device 2100. For example, to provide LEDs of the combination device 2250 with sufficient power the supply current needs to be distributed over multiple electrodes. In the example show in FIG. 23, ten electrodes are provided for providing power and/or data to the touch panel. For electrical contact pads 2270 provided for receiving user inputs from the switch element 2230 or carrying data to the combination device 2100, only one electrode 2310 in the touch panel may be required between the electrical contact pad 2270 and the corresponding electrical contact strip 2305.

FIG. 24 shows another example of providing power and/or data to electronic devices on the surface of a touch panel 2405. Electronic devices shown in the embodiment comprise a printed circuit board (PCB) 2410 including a plurality of addressable RBG LEDs arranged in an arc. Other arrangements of LEDs and different electronic devices may optionally be integrated on a surface of the touch panel 2405. The PCB 2410 comprises a number of electrical contact points that are soldered to electrical contact pads 2420 in the touch panel, each connected to an end region of at least one electrode 2430 in the touch panel for receiving power and/or data via the electrodes 2430 in touch panel. Three spaced apart arcs of different numbers of LEDs are shown in FIG. 24.

A distal end region of the at least one electrode 2430 is connected to at least one electrical contact strip 2440. The electrical contact strip 2440 provides power and/or data from an external device to electronic devices on the touch panel via electrodes 2430 in the touch panel.

FIG. 25 illustrates an example electrical contact pad or strip 2510 of the embodiments described above. The electrical contact pad 2510 may be made of at least one tin-plated copper track on polyimide backing, with an end portion folded back on itself. The electrode pad 2510 may be provided on the same adhesive layer as electrodes of a touch panel 2520 described in embodiments disclosed above. A polyester layer 2530 may be provided over the adhesive layer and contact pad 2510. Folding back an end portion of the electrical contact pad 2510 of the present embodiment ensures that a tin-plated portion of the electrical contact pad abuts the polyester layer 2530. Connecting an electronic device to a contact pad 2510 requires soldering 2540, or other electrical connection process such as solder reflow or welding, to be used to remove part the polyester layer proximate to the electrical contact pad 2510.

FIG. 26 illustrates an example of a gaming machine 2600 including a touch 2605 panel and at least one combination device 2100 provided at the touch panel 2605. Optionally, a plurality of combination devices, user input devices, electronic devices or a combination thereof may be provided at the touch panel 2605. Optionally, a plurality of devices may be arranged at the touch panel 2605 of the gaming machine 2600 in order to allow multiple users to use the gaming machine 2600 simultaneously. Alternatively, the gaming machine 2600 is an information console. For example, the gaming machine may be configured to receive information on user preferences via the touch panel 2605 and the at least one combination device 2100. Two combination devices are shown in FIG. 26 and these are located at opposed ends of a central touch sensitive area where imagery is displayed as part of a game.

FIG. 27 illustrates a further example embodiment of a gaming machine 2700 that includes at least one touch panel 2705 in a first region of the gaming machine 2700. Optionally, a further touch panel may be provided 2710 in a further region of the gaming machine 2700. In the example embodiment shown, combination devices 2100 are shown at the at least one touchscreen 2705. Optionally, other types of combination device, user input device, and electronic device or a combination thereof may be provided at the at least one touch screen 2705. Electronic devices, for example LEDs 2310, may be provided at the further touch panel 2710. Optionally, other types of electronic device, user input device, and combination device or a combination thereof may be provided at the further touch panel 2705. The gaming machine 2700 may also include other electronic devices such as lighting 2720, speakers, haptic and NFC devices in still further regions of the gaming machine 2700. Alternatively, the gaming machine 2700 is a kiosk or terminal that a user may use to access information or make purchases at a store.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of manufacturing a touch panel for a touchscreen, comprising:
   plotting at least one wire, on a layer of adhesive over a transparent substrate that comprises at least one through hole, in a predetermined pattern that comprises a first portion that extends over the substrate and a further portion that extends over a region of a transparent support that extends over at least a region of the through hole;
   providing touch electrodes for a touch panel of a touchscreen via the first portion of the plotted wire; and
   providing a plurality of electrical connectors for a user input device secured at the through hole, via the further portion of the plotted wire.

2. The method of claim 1, further comprising:
   providing the transparent support by providing a transparent film on an adhesive layer on a first surface of the substrate; whereby
   the transparent film includes a respective film hole substantially in registration with each through hole in the substrate and a remainder tail region that extends over the region of the through hole.

3. The method of claim 1, further comprising:
   securing a flexible connector strip that comprises a plurality of first conductive pads to the electrical connectors whereby each pad is in respective electrical connection with at least one electrical connector.

4. The method of claim 3, further comprising:
   securing a plurality of further conductive pads of the connector strip, each connected to a respective one of the first conductive pads, to respective electrical contacts of the user input device.

5. The method of claim 1, further comprising:
   plotting the wire in a pattern whereby wire that provides touch electrodes is interweaved with wire that provides an electrical connector.

6. The method of claim 1, further comprising:
   plotting the wire in a pattern whereby at each intersection, wire that provides touch electrodes crosses wire that provides an electrical connector substantially orthogonally.

7. The method of claim 1, further comprising:
   providing touch electrodes comprises cutting previously plotted wire in a plurality of locations to thereby provide a plurality of X and Y touch electrodes.

8. The method of claim 1, whereby providing the plurality of electrical connectors comprises cutting previously plotted wire in a plurality of locations to thereby provide a plurality of distinct lengths of wire that extend from an edge region of the substrate to a location over the transparent support within an imaginary boundary associated with an edge of a through hole in the substrate.

9. The method of claim 1, further comprising:
   providing a user input device at the through hole by securing a mechanical button or joystick or the like to the substrate at the through hole whereby at least one contact switch of the user input device is electrically connected with at least one electrical connector provided via the further portion of the plotted wire.

10. A touch panel for a touchscreen, comprising:
    a plurality of touch electrodes provided by cut sections of at least one wire plotted on a layer of adhesive over a transparent substrate that comprises at least one through hole;
    a plurality of electrical connectors provided via cut sections of at least one wire plotted on said layer; and
    at least one user input device each secured at a respective through hole in the substrate wherein each user input device comprises at least one switch element electrically connected with at least one said electrical connector.

11. The touch panel of claim 10, wherein:
    the touch electrodes comprise a first group of electrodes that extend across a region of the substrate following a constant repetitive pathway and a further group of electrodes that extend across the substrate following the same constant repetitive pathway for a portion of their length but that include, proximate to a through hole, a modified pathway around an edge of a through hole.

12. The touch panel of claim 10, wherein:
the electrical connectors comprise plotted sections of wire that extend on the adhesive across the substrate and beyond an edge of a through hole on a region of a layer of adhesive over a region of a transparent support.

13. The touch panel of claim 12, wherein:
each electrical connector comprises at least one end portion of one or more sections of plotted wire that are electrically connected to a pad of a flexible connector strip.

14. The touch panel of claim 10, further comprising:
a touch controller unit connected to end regions of the touch electrodes and end regions of the electrical connectors via respective connecting elements at an edge region of the substrate.

15. The touch panel of claim 10, further comprising:
a user input device at each through hole in the substrate, each user input device comprising a fascia at a touch surface of the substrate, a base spaced apart from but secured to the fascia, a user input between the fascia and the base, wherein the user input is moveable by a touch panel user's hand; and
at least one switch that has a state selectable by movement of user input, that is in electrical communication, via at least one electrical connector, to a controller of the touch panel.

16. The touch panel of claim 10, wherein:
the touch panel is arranged to sense touches via an active area of the touch panel and further user input via movement of a user input device indicative of a user choice.

17. A touchscreen, comprising:
a display; and
the touch panel of claim 10.

18. A gaming machine, arcade game, kiosk, ATM or digital sign comprising the touchscreen of claim 17.

19. A user input button for a touch panel comprising a transparent substrate including at least one through hole, comprising:
a fascia;
a base;
a user input between the fascia and the base;
at least one switch that has a state selectable by movement of the user input; and
a flexible connector strip comprising a plurality of first contact pads, at a distal end of the flexible connector strip, connected to electrical connectors provided via wire plotted on an adhesive layer, and further contact pads in respective electrical communication with the first contact pads connected to wires that extend through the user input button to connect the switch to the electrical connectors.

20. The user input button of claim 19, wherein the user input comprises a button manufactured from a transparent material.

* * * * *